United States Patent [19]

Goettelmann et al.

[11] Patent Number: 5,551,015

[45] Date of Patent: *Aug. 27, 1996

[54] METHOD AND APPARATUS FOR DIRECT CONVERSION OF PROGRAMS IN OBJECT CODE FORM BETWEEN DIFFERENT HARDWARE ARCHITECTURE COMPUTER SYSTEMS

[75] Inventors: John C. Goettelmann, Point Pleasant; Christopher J. Macey, Red Bank, both of N.J.

[73] Assignee: Lucent Technologies Inc., Murray Hill, N.J.

[*] Notice: The term of this patent shall not extend beyond the expiration date of Pat. No. 5,313,614.

[21] Appl. No.: 504,797

[22] Filed: Jul. 20, 1995

Related U.S. Application Data

[63] Continuation of Ser. No. 133,707, Oct. 8, 1993, abandoned, which is a continuation of Ser. No. 280,774, Dec. 6, 1988, Pat. No. 5,313,614.

[51] Int. Cl.[6] .................................................. G06F 17/00
[52] U.S. Cl. .......................................... 395/500; 395/700
[58] Field of Search ...................................... 395/500, 700

[56] References Cited

U.S. PATENT DOCUMENTS

| | | | |
|---|---|---|---|
| 4,667,290 | 5/1987 | Goss et al. | 395/700 |
| 4,791,558 | 12/1988 | Chaitin et al. | 395/500 |
| 4,951,195 | 8/1990 | Fogg, Jr. et al. | 395/375 |
| 5,142,681 | 8/1992 | Driscoll et al. | 395/700 |

*Primary Examiner*—Richard L. Ellis
*Attorney, Agent, or Firm*—Eugene S. Indyk

[57] ABSTRACT

Application programs compiled for a first, "source", computer are translated, from their object form, for execution on a second, "target", computer. The translated application programs are linked or otherwise bound with a translation of the source computer system software. The translated system software operates on the image of the source computer address space in the target computer exactly as it did in the source computer. The semantics of the source computer system software are thus preserved identically. In addition, a virtual hardware environment is provided in the target computer to manage events and to deal with differences in the address space layouts between the source and target computers.

11 Claims, 18 Drawing Sheets

| CALLING PROCEDURE PROC_K | DEFINITIONS | USES |
|---|---|---|
| Z+ 10 | | |
| . | | |
| . | | |
| . | | |
| X= Z | | |
| . | | |
| . | | |
| . | | |

CALL PROC_J    (A,B,R,W,X,Y,Z)

B= X
A+ Y
X= A+B
.
.
.

CALL PROC_J    (A,B,R,W,X,Y,Z)

Y= A+B
W= 10
RETURN

CALLED PROCEDURE PROC_J
.
.
.
X= Q+S
.
.
.
RETURN             (A,B,R,X,Y)

FIG. 22

| CALLING PROCEDURE PROC_K | DEFINITIONS | USES |
|---|---|---|
| | (Q,S) | (Q,S) |
| Z= 10 | Z | |
| . | | |
| . | | Z |
| . | | |
| X= Z | | (Q,S) |
| . | | |
| . | | |
| . | | |
| CALL PROC_J | X | X |
| B= X | B | Y |
| A+ Y | A | A,B |
| X= A+B | X | |
| . | | (Q,S) |
| . | | |
| . | | |
| CALL PROC_J | X | A,B |
| Y= A+B | Y | |
| W= 10 | W | |
| RETURN | | (R̸,W,Y) |
| CALLED PROCEDURE PROC_J | (Q̸,S̸) | |
| . | | Q,S |
| . | | |
| . | | |
| X= Q+S | | |
| . | | |
| . | X | |
| RETURN | | (A̸,B̸,R̸,X,Y̸) |

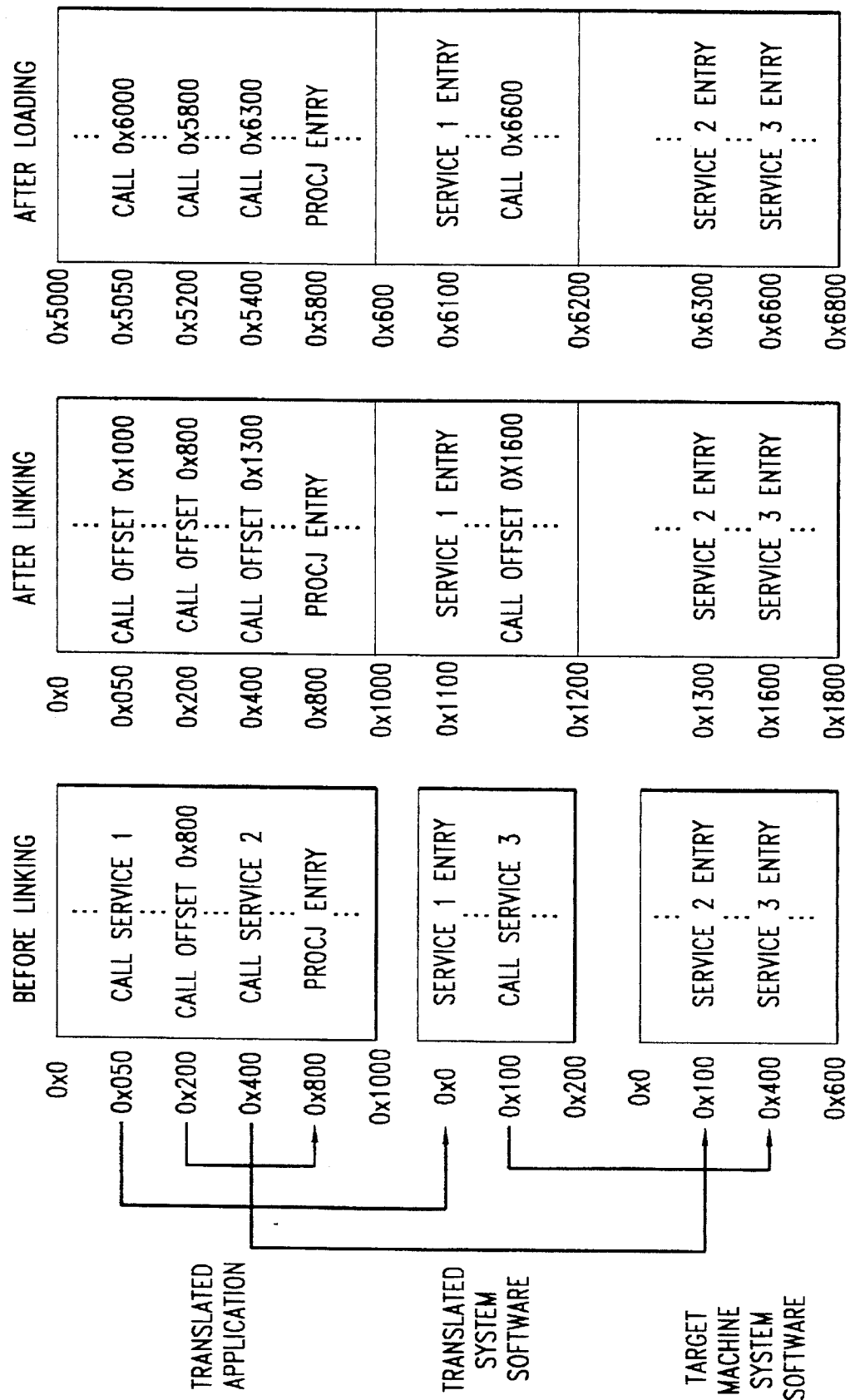

METHOD AND APPARATUS FOR DIRECT CONVERSION OF PROGRAMS IN OBJECT CODE FORM BETWEEN DIFFERENT HARDWARE ARCHITECTURE COMPUTER SYSTEMS

This application is a continuation of application Ser. No. 08/133,707, filed on Oct. 8, 1993, now abandoned, which is a continuation of application Ser. No. 07/280,774, filed Dec. 6, 1988 now U.S. Pat. No. 5,313,614.

CROSS REFERENCES TO RELATED APPLICATIONS

This application is related to U.S. application Ser. No. 280,774, filed Dec. 6, 1988, now U.S. Pat. No. 5,313,614, entitled "Method and Apparatus for Direct Conversion Of Programs in Object Code Form Between Different Hardware Architecture Computer Systems."

This application is also related to U.S. application Ser. No. 616,507, filed Nov. 21, 1990, entitled "Translation Technique," which is a continuation of U.S. application Ser. No. 280,774, filed Dec. 6, 1988.

This application is also related to U.S. application Ser. No. 136,720, filed Oct. 13, 1993, entitled "Technique For Executing Translated Software Using Translated System Software", which is a continuation of U.S. application Ser. No. 850,238, filed Mar. 11, 1992, which in turn is a continuation of U.S. application Ser. No. 280,767, filed Dec. 6, 1988.

BACKGROUND OF THE INVENTION

The present invention relates to the field of computer program code translation.

Historically, high-level computer source languages such as FORTRAN, COBOL and PL/1 were developed to provide not only ease of programming, but also portability among various computers by enabling programs to be written in machine-independent languages and thereafter translated into machine-dependent object code form by a compiler. Thus, computer users and vendors, having made the (often enormous) investment in the development of a software system, were provided with a relatively inexpensive means of upgrading their computer hardware without losing the benefit of that investment.

Compiler technology is not the total solution, however. For example, the source code for a program may be unavailable, because, perhaps, the party owning it is not willing to make it available for recompiling or, in the case of older programs, it has simply been lost. Additionally, the resolution of the dissimilarities among various hardware configurations may be beyond the scope of compiler technology; the principal function of a compiler is to resolve differences in semantics and syntax from one processor to another, not differences in particular features of the computer hardware and operating system. For example, a program taking advantage of particular graphics capabilities of one computer cannot simply be recompiled to run on a machine that does not have those capabilities. (The terms "computer" and "machine" are used interchangeably herein.)

The above considerations have magnified with the personal computer explosion. A wide variety of hardware configurations have been introduced into the marketplace and, because of the above-described limitations of compiler technology, it is expensive to port sophisticated programs, such as word processors and graphics-oriented packages, from one hardware configuration to another. This has led to a lag in the development of programs relative to the marketplace introduction of new hardware; software developers have hesitated to commit the resources to such porting until sufficient sales of the hardware have evidenced the likelihood of reasonable return on the porting effort. By the same token, computer vendors have had to wait for third-party software developers to commit to porting their software to the new hardware base before they could profitably market their hardware—a real catch-22.

In response to this situation, some vendors have developed schemes by which the unported version of the software, designed to execute on a first or "source" computer, is made to execute on a different, "target" computer. Such schemes include so-called hardware and software emulation.

Specifically, hardware emulation involves the introduction of, for example, a co-processor which replicates, in hardware, the functionality of the source computer. The merits of this approach include performance comparable to that of the source machine and the ability to execute most of the applications developed. However, it is quite difficult to exactly replicate the necessary functionality of the source machine in a cost-effective manner. Indeed, it is often the case that, due to architectural differences between the source and target machines (e.g., differing bus architectures), certain nonstandard peripherals used in the source machine (e.g., graphics controllers) cannot be supported in the target machine, thereby precluding the execution on the target machine of programs that relied on the presence of such peripherals. Such limitations of hardware emulation approaches have relegated them to only limited success in the marketplace.

The other approach, software emulation, involves the use of so-called emulation software, which takes, as input in real time, object code programs compiled for the source machine, identifies each instruction as it needs to be executed, and performs an equivalent operation on the target machine by executing a sequence of target machine instructions which replicates the functionality of the original instruction. This has the effect of converting the source machine instruction to one or more target machine instructions. In cases in which the source machine instruction would have invoked operating system or other machine-specific services of the source machine, the emulation software must further include software which recognizes the occurrence of each such invocation and accesses a corresponding target machine service.

One of the merits of the software emulation approach is the fact that it is relatively inexpensive. Moreover, the emulation software can be easily modified to accommodate both a) changes made to the source and/or target machines and b) necessary corrections to the emulation software itself, e.g., to fix "bugs". On the other hand, in order for the emulation to execute on the target machine with performance comparable to that of the source program executing on the source hardware, the target machine hardware must provide performance substantially superior to that of the source machine hardware as described below. Depending on the capabilities of the source machine, this criterion may be unattainable at reasonable cost.

There are at least two reasons why a software emulation requires superior performance from the target machine, both being due to the real-time nature of software emulation. The first relates to the fact that, in addition to the actual execution of the emulating target machine instructions, time is required to first convert each source machine instruction as it is encountered in the input stream. The second reason relates to the need to replicate both the primary and so-called side effects of the source processor instruction set.

As the term implies, the primary effect of any instruction is the fundamental purpose of the instruction. (For example, the primary effect of an ADD instruction is the addition of two quantities, while the primary effect of a JUMP instruction is the changing of the flow of control.) By contrast, side effects include pieces of information resulting from the execution of an instruction which are maintained by the hardware for further reference by the executing program. (The term "side effect" as used herein is defined more rigorously hereinbelow.) Side effects include, for example, the setting of condition code registers. Inasmuch as the emulation software operates on an instruction-by-instruction basis and therefore cannot determine when, if ever, such side effects will be referenced later in the execution, all side-effects must be duplicated in the target machine. Because in the source machine these side effects are carried out by the processor hardware as an integral part of the instruction itself, they do not significantly affect performance in the source machine. However, differences in the processors used in the source and target machines are typically such that execution of the individual instructions of the software emulation on the target machine may result in side effects that are completely different from those of the source instructions executed on the source machine. Therefore, each side effect of each source machine instruction that does not have an equivalent on the target machine must be explicitly emulated on the target machine via a separate target machine instruction or instruction sequence. This results in a voluminous expansion of the program code.

As a consequence of the foregoing, the target machine must be capable of executing a great number of instructions in the time that the source machine would have executed a single instruction in order to simply provide performance comparable to that of the program executing on the source machine. This may be readily achievable if the source machine is of an older, inferior technology, in which case a target machine with substantially superior performance may well be available at reasonable cost. Disadvantageously, however, if the source and target machines are of similar technology, then the user must either accept substantially degraded performance or invest in a superior, and undoubtedly much more costly, target machine.

A third approach to the execution on a target machine of software developed for another machine is referred to as "translation"—an approach which overcomes at least some of the drawbacks of both hardware and software emulation as outlined above.

Translation is similar to software emulation in that it involves the use of software which typically takes, as its input, object code programs compiled for the source machine and converts each source machine instruction to one or more target machine object code instructions which replicate both the primary and side effects of the source processor instruction set. However, while the software emulation approach involves the processing of source machine instructions in real time, i.e., as they are encountered in the program input stream, translation does this "off line" and stores the resulting target machine instructions for later execution. The advantage of this approach is that the loss of performance occasioned by the need to perform the conversion of source machine instructions at execution time is avoided. Disadvantageously, however, the translation typically requires vast amounts of storage space due to the aforementioned expansion of program code, as described above. Moreover, since the translation must still emulate side effects, it potentially suffers from the same performance degradation as software emulation.

SUMMARY OF THE INVENTION

The foregoing considerations have, to this point, rendered translation an essentially unused alternative. However, in accordance with the present invention, it has been recognized that a translation having dramatically improved performance and reduced size can be achieved by analyzing the expanded program code and eliminating instructions that are, in fact, unnecessary. "Unnecessary" instructions are instructions whose elimination does not affect the functionality of the program, i.e., the program input/output characteristics as they appear to the user, e.g., computational results, screen displays, output files, etc. In accordance with a feature of the invention, we have further realized that so-called data flow analysis techniques, heretofore developed and used in compiler technology, can be advantageously applied to the translation problem in order to perform the analysis and elimination of unnecessary instructions.

In preferred embodiments, more particularly, the analysis and instruction elimination are carried out globally. That is, the necessity or non-necessity of retaining or eliminating a particular instruction is determined on the basis of an examination of the entire program being translated (as opposed, for example, to only a basic flow block or procedure). This approach maximizes the amount of program code that can be identified as being, in fact, unnecessary. (Indeed, this is important because the expanded code is so voluminous that it is advantageous to exploit every opportunity to reduce its size.) Advantageously, the developed-for-compilers techniques of definition-use chaining and dead code elimination may be employed to accomplish this end.

For most programs of practical interest, performing the global data flow analysis techniques treating the entire program as a single unit is impractical. The complexity of flow of control is typically such that treating the program as a single unit results in time and memory space requirements that cannot be satisfied from a practical standpoint. In accordance with a further feature of the invention, however, this potential stumbling block is avoided by performing the analysis on a procedure-by-procedure basis (the concept of "procedure" being fully explained in the sequel). In order to then carry out the global aspects of the analysis, the analysis also takes account of inter-procedural relationships. The latter is illustratively achieved by performing multiple data flow analysis passes over the program. In each pass, the order of processing the individual procedures is guided by a so-called call tree which defines the calling relationships among the procedures.

It may also be noted that the need to retain those instructions of the expanded code that are, in fact, necessary means that the translation still may require substantially more storage than the original object code and will execute with some performance penalty. However, in accordance with a further feature of the invention, so-called pattern recognition and other optimization techniques can be used to reduce the translation to a level which can closely approach the original object code in terms of size and, perhaps, exceed it in performance, all other relevant parameters being equal.

BRIEF DESCRIPTION OF THE DRAWING

In the drawing,

FIGS. 21 and 22 illustrate how program code is processed during the two data flow analysis passes performed during the optimization component of the translator in accordance with a feature of the invention; and FIG. 23 shows the manner in which a translated application is bound to the translated system software and target machine system software.

DETAILED DESCRIPTION

EMULATION AND TRANSLATION—GENERAL

Source Computer

Figure 1:
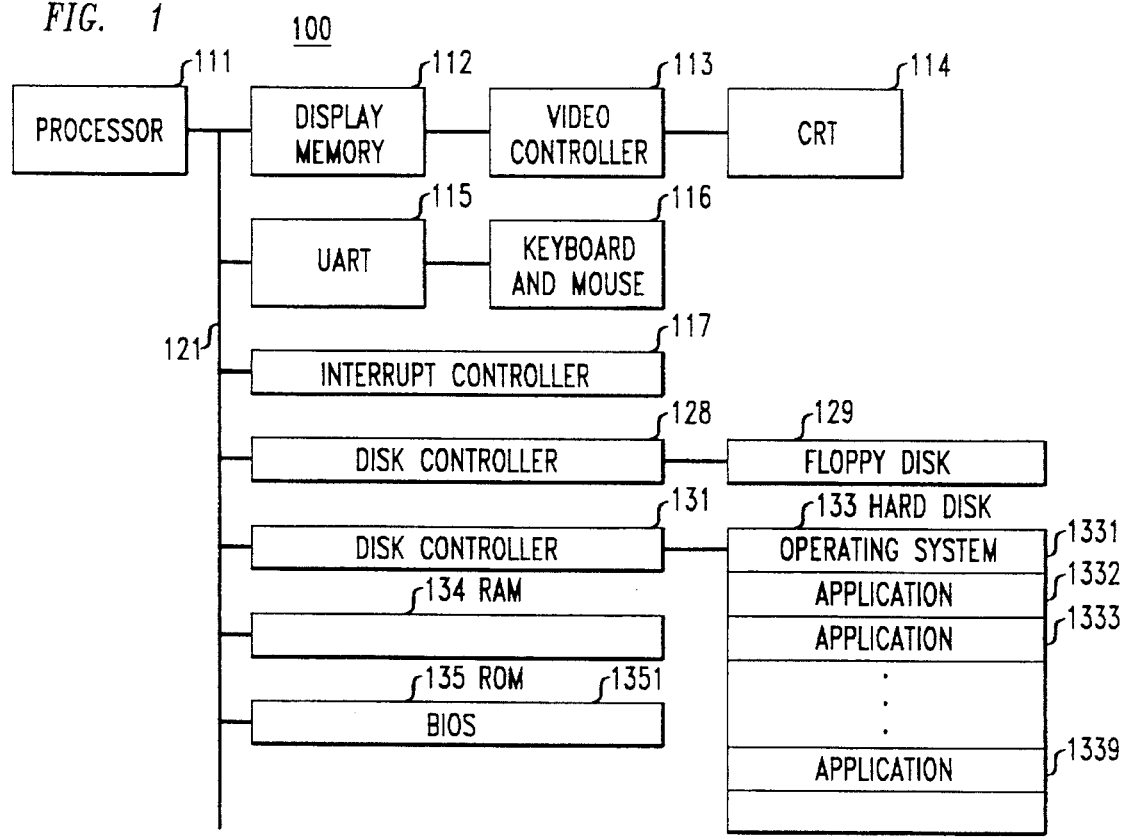
FIG. 1 is a block diagram of an illustrative source computer.

Computer 100 of FIG. 1 is a personal computer, at the heart of which is a processor 111 having address, data and control buses denoted generically as bus 121. Connected to bus 121 are a number of peripheral devices, including display memory 112 whose contents are used by a video controller 113 to generate video signals for a CRT 114; a universal asynchronous receiver transmitter (UART) 115, which serves as a serial interface between processor 111, on the one hand, and, on the other hand, a keyboard and mouse denoted generically at 116; an interrupt controller 117, to which hardware interrupt leads (not shown) extend, inter alia, from UART 115; a floppy disk controller 128, which serves as an interface between processor 111 and a floppy disk memory 129; a hard disk controller 131, which serves as an interface between processor 111 and hard disk memory 133; random access memory (RAM) 134, which holds copies of programs (including the operating system described below) currently available for execution as well as data created and/or used by executing programs; and read-only memory (ROM) 135.

In the context of the present embodiment, computer 100 is a "source" computer and, as shown in FIG. 1, hard disk 133 holds copies of various "source" applications 1332, 1333, . . . 1339. Applications 1332, 1333, . . . 1339, which have been compiled for execution on computer 100, may include, for example, word processors, graphic packages, spreadsheets, computer games, etc., and illustratively were read onto hard disk unit 133 from floppy disk unit 129. These applications can be loaded into RAM 134 for execution by computer 100 or, alternatively, be translated in accordance with the principles of the present invention on a "translating" computer for execution on some other, "target", computer. Either the source or target computer may also serve as the translating computer. In the present embodiment, however, three different computers are used. The translating and target computers are, in particular, shown in FIGS. 2 and 3, respectively, and are described hereinbelow.

Computer 100 operates under the control of its so-called system software, the function of which is to perform various services for applications and manage the overall functioning of the computer. Thus, for 15 example, the system software provides file and memory management services; display, keyboard and mouse input/output (I/O)functions; serial port management; etc.

The system software of computer 100 illustratively has two components: the Basic Input/Output System (BIOS) and the operating system.

The BIOS of a computer resides in non-volatile memory, i.e., ROM, and for this reason is often referred to as the ROM BIOS. In computer 100, in particular, the ROM BIOS resides in ROM 135 and is denoted 1351. ROM BIOS 1351 contains software procedures for performing basic input/output services such as the aforementioned display, keyboard and mouse functions, as well as providing low-level access to both the hard and floppy disks. ROM BIOS 1351 further includes a procedure referred to as the "boot loader". This procedure is called via a so-called hardware reset mechanism when the computer is powered on. Its principal functions are to perform an elementary check of machine functioning and then load the remainder of the system software—operating system 1331—into RAM 134 from hard disk 133. Thus loaded in RAM, the operating system becomes available for subsequent execution and, indeed, the ROM BIOS passes control to the operating system at the end of boot loader execution.

Operating system 1331 contains the balance of the system software including, therefore, procedures which, as noted above, manage the overall functioning of the computer, provide file and memory management services, serial port management, etc.

From the software execution standpoint, the particular partitioning of the system software between BIOS and operating system, or between RAM and ROM, is unimportant. In some machines, for example, the entire system software resides in ROM while in others only the boot loader is stored in ROM. It may be noted, however, that implementing the notion of translating the system software, as described in detail hereinbelow, does not at all depend on just how the system software happens to be partitioned between RAM and ROM in a particular source computer.

Address Space

Processor 111 communicates with its various peripheral devices over bus 121 by issuing addresses on the address leads of the bus and, at the same time, providing, on the data and control leads, commands and data directed to the device being addressed. Indeed, similar operations are used whether the device being accessed is physically implemented as a (ROM or RAM) memory location or as a so-called hardware device or peripheral, e.g., disk controller register. The addresses associated with a particular device are frequently fixed at the time of manufacture and the ensemble of all such addresses is referred to as the "address space" of the computer.

Figure 4:
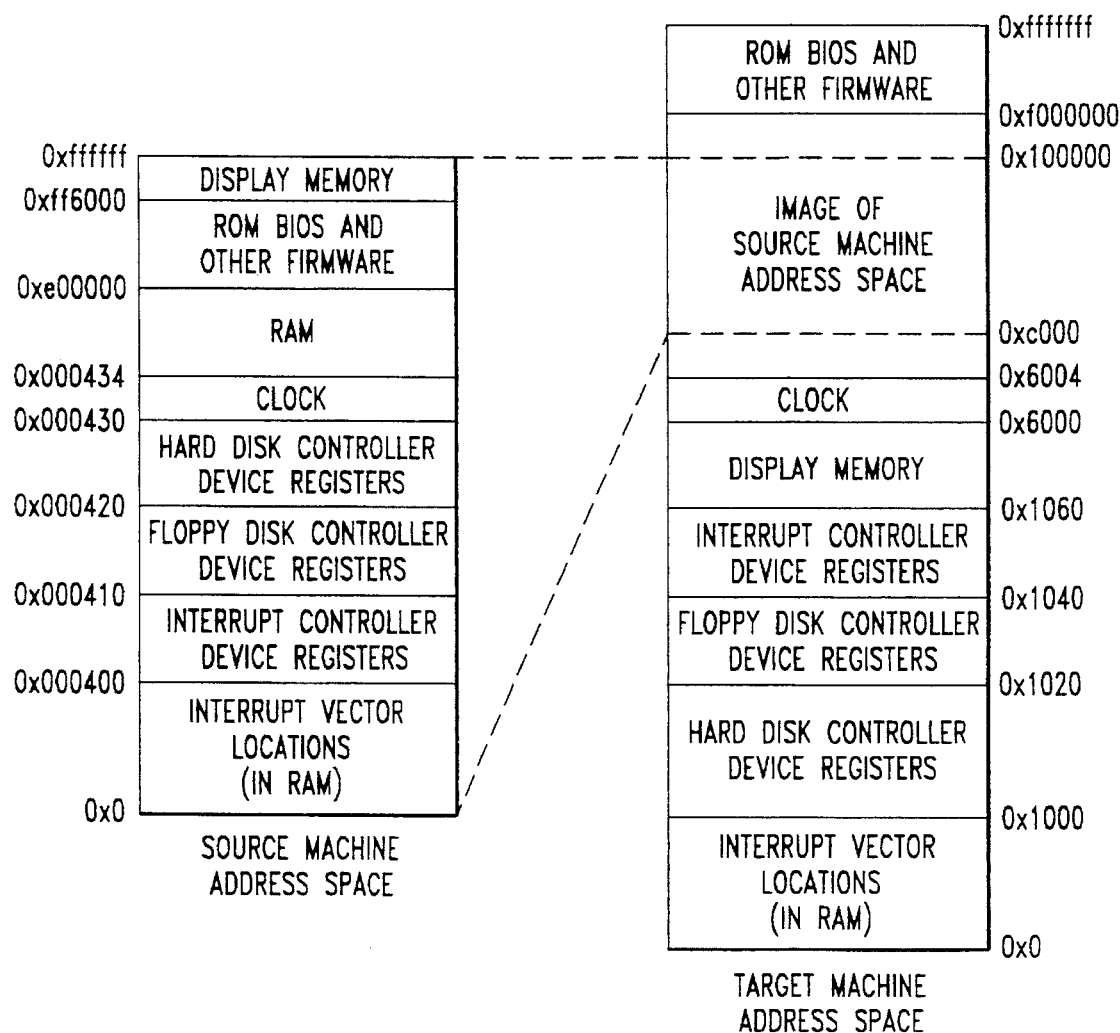
FIG. 4 shows a logical view of typical source and target computer address spaces.

FIG. 4 provides a logical view of an exemplary source machine address space. In particular, the so-called interrupt vectors (stored in RAM) are located in the address space beginning at location 0; a number of interrupt controller device registers are located in the address space beginning at (hexadecimal) location 0x000400; a number of floppy disk controller device registers are located in the address space beginning at location 0x000410; a number of hard disk controller device registers are located in the address space beginning at location 0x000420; the clock register is located in the address space beginning at location 0x000430; RAM addresses resume at location 0x000434; ROM BIOS and other firmware are located beginning at location 0xe00000; and display memory is located in the address space beginning at location 0xff6000 and ending at 0xffffff.

By convention, often unenforced by the hardware design, application programs are only supposed to access that portion of the address space that corresponds to RAM. All other portions of the address space are supposed to be accessed exclusively by system software, i.e., the operating system and ROM BIOS. Thus, an application requiring communication with such other portions of the address space are supposed to request same by way of calls to particular procedures within the system software which perform the access on behalf of the application. Applications which, in order to improve performance by bypassing the system software, ignore these conventions are termed "rogue", as is discussed in further detail hereinbelow.

At this point, it will be useful to consider in some detail the prior art hardware emulation, software emulation and translation approaches for executing programs complied for a first, source, machine on a second, "target", machine.

In general, every different types of computer has a different address space layout. This, too, is illustrated in FIG. 4, which further shows an illustrative address space for a target machine on which applications compiled for a source computer may be either emulated (using either hardware or software emulation) or translated.

Note that the address space layouts for the source and target machines are different, as will typically be the case. In particular, the interrupt vectors of the target machine (stored in RAM) are located in the address space beginning at location 0; a number of hard disk controller device registers are located in the address space beginning at location 0x1000; a number of floppy disk controller device registers are located in the address space beginning at location 0x1020; a number of interrupt controller device registers are located in the address space beginning at location 0x1040; display memory is located in the address space beginning at location 0x1060; the clock register is located in the address space beginning at location 0x6000; RAM addresses resume at location 0x6004; and ROM BIOS and other firmware are located beginning at location 0xf000000 and ending at 0xffffff.

Other types of differences between the source and target machine address spaces may also exist: For example, one machine may have separate address spaces for accessing memory and for accessing Input/Output (I/O) devices. These are really the same as having a single (albeit larger) address space that includes everything. Therefore, in the ensuing discussion, the term address space may always be thought of as encompassing memory as well as I/O and an address may refer to either a location or an I/O device register.

The differences between the address spaces of the source and target machine are accounted for in (hardware or software) emulations and translations by mapping the entire source machine address space into a RAM portion of the target machine address space-illustratively between locations 0xc000 and 0x100bfff, as shown in FIG. 4. There is thus a one-to-one correspondence between locations in the actual source machine address space and its so-called "image" in the target machine address space. It is a simple matter then for the emulation or translation software to add an offset to the addresses contained in the various emulated/translated program instructions so that they refer to the appropriate locations in the image of the source machine address space image. Thus, for example, address 0 appearing in any source machine instruction will be converted to address 0xc000 in the corresponding emulated/translated instruction, and so forth. As long as the application is not rogue, its correct functioning is preserved by this approach because non-rogue-program references to locations in the address space are always references to RAM. Since RAM locations are indistinguishable from one another, accesses to particular locations in RAM by the executing software emulation or translation will, in fact, be successful.

On the other hand, the correspondences between the various non-RAM portions of the source machine address space and their image in the target machine are, in general, lost, because, as noted above, the layouts of the respective address spaces are almost always different. In FIG. 4, for example, the addresses of the device registers in the source machine are addresses of interrupt vectors in the target machine. Thus if an application compiled for the source machine directly reads a source machine device register location (i.e., the application is rogue), the read may "succeed" from a memory operation standpoint but, of course, incorrect data will have been read.

In theory, the various non-RAM source machine addresses appearing in the source machine application program instructions could be recognized and mapped into the corresponding addresses in the target machine address space. However, the existence of differences in the computers themselves—e.g., differences in the conventions for controlling different manufacturers' realizations of peripheral devices of a given generic type, e.g., hard disk controllers—will almost always mean that such mapping is not possible. Known emulation and translation approaches are thus simply not able to effectively handle rogue programs.

The above considerations relative to rogue programs also apply to the procedures which implement source machine system calls since those procedures must, of necessity, reference non-ordinary RAM areas of the source machine address space. Moreover, the system software in the target machine may provide different services, or provide them with different conventions, than the source machine system software. Known emulation and translation approaches deal with this by recognizing system calls in the source machine application program instructions and using custom-written software—referred to herein as a "system simulation"—which provides equivalent services by accessing the target machine address space either directly or via calls to the target machine system software. The latter, of course, is written with knowledge of the layout of the target machine address space. The aforementioned differences in both address space layout and system software design are thereby accommodated.

It may also be noted at this point that all discussions herein relative to RAM or RAM locations, in either source or target machines, should not be understood as necessarily referring to discrete physical memory. Well-known techniques exist for creating so-called "virtual memory" which creates the illusion of a large physical memory system when only a small physical memory system is present. All discussions herein, therefore, apply to source and target computer systems employing virtual memory techniques, as well as those which do not.

Emulation

Figure 5:
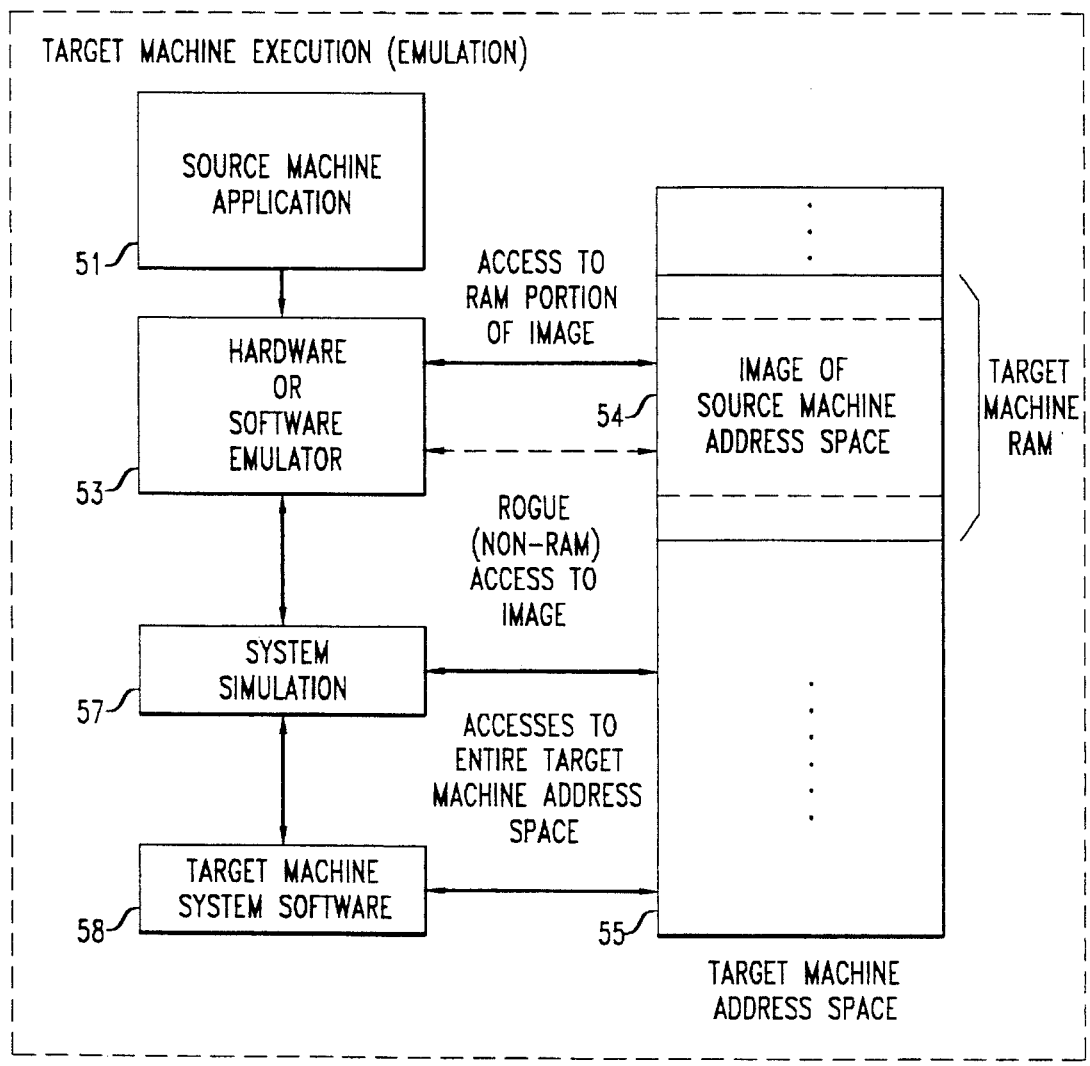
FIG. 5 is a logical view of object code hardware and software emulation.

Building now on the foregoing, reference is made to FIG. 5, which is a logical view of the hardware and software emulation approaches known in the prior art. In particular, source machine application 51 is used as input to either a hardware or software emulator 53 executing in the target machine. Initially, the emulator constructs an image 54 of the source machine address space by requesting, from the target machine system software 58, a suitable amount of memory within the target machine address space 55. Emulator 53 then proceeds to a) decode (as explained below) the program instructions of application 51; b ) if the decoded instruction is not a system call, map (as also explained below) the instructions onto an equivalent sequence of operations of the target machine instruction set; and c) execute the resulting mapped instruction sequence.

Decoding, in particular, is the action of partitioning the compiled source machine application into its individual component instructions (each typically being comprised of an operation code—indicating which action to perform—followed optionally by one or more operands, e.g., the addresses of registers in which data to be operated on reside) and, in the process, identifying the action to be performed and the data to be operated upon. Mapping is the action of determining, for each source machine instruction, an equivalent sequence of operations in the target machine, including side effects, using the target machine instruction set. As part of the mapping process, the emulator adds the aforementioned offset to the addresses contained in the various instructions, as mentioned above, so that the instructions in the software emulation refer to the appropriate locations in the target machine RAM. The resulting mapped instruction sequence is then executed in the target machine during the aforementioned executing step.

If, upon decoding a particular instruction, emulator 53 determines that it is a system call, it does not proceed with mapping as described above. Rather, it passes control to the aforementioned simulation of the source machine system software-system simulation 57. System simulation 57 thereupon carries out the requested service by accessing target machine address space 55 either directly or via target machine system software 58.

Finally, as noted above and as shown by the dashed line in FIG. 5, attempts by rogue programs to access locations in the source machine address space image 54 that are outside of the RAM portion of the image will not, in general, result in the desired functionality being carried out.

(For purposes of depicting the interaction between emulator 53, system simulation 57 and target machine system software 58, on the one hand, and target machine address space 55, on the other hand, the former are shown in this logical view as being outside of the latter. In actuality, all software executing in the target machine must reside within the target machine address space—in order to be executed. This approach is similarly followed in FIGS. 7 and 8.)

To this point, it has been assumed that hardware and software emulation operate equivalently. Indeed, they do, at the functional level presented in FIG. 5. The principal difference is that, in a software emulation, the processor in the target computer is relied upon to perform all of the above-described operations whereas, in a hardware emulation, the target machine contains a second processor identical in type to that of the source machine and the source machine application program code is executed directly on this second processor. This approach provides certain efficiencies in that the aforementioned decoding step is not needed at all and the mapping step is needed only to the extent of performing the aforementioned offset addition. The performance of the hardware emulation is thus, in general, better (typically by a factor of 100) than that of the software emulation. On the other hand, since the source and target machine system environments are different, the hardware emulation must still rely on the target machine processor to carry out system services via system simulation as described above. The principal disadvantage of hardware emulation is that the hardware required to emulate a particular source machine adds significantly to the cost of the target machine. Indeed, a different hardware emulator is required in the target machine for each source machine being emulated. Thus, running software from, for example, three source machines requires four processors—the target processor plus one for each of the source machines.

Translation

Advantageously, translation overcomes some of the drawbacks of both software and hardware emulation.

Translation is similar to software emulation in that it involves the use of software—referred to herein as the "translator"—which takes, as its input, programs compiled for the source machine and decodes and maps each source machine instruction to one or more target machine instructions which replicate the functionality of each source machine instruction. In contradistinction to software emulation, however, the decoding and mapping is performed "off line" and the resulting software translation is saved so that it can be executed over and over again rather than being recreated each time the application is to be executed on the target machine.

Figure 6:
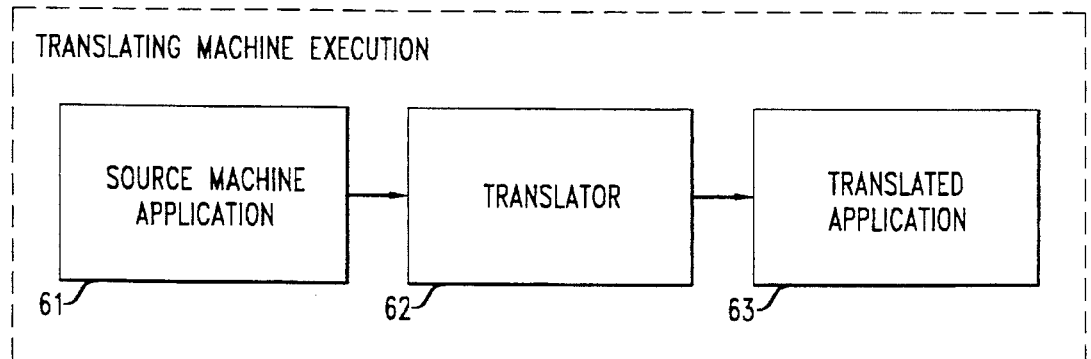
FIG. 6 is a logical view of the off-line phase of object code translation.

FIG. 6 depicts the off-line phase of the translation process which, as noted above, is carried out in a "translating" computer. In particular, source machine application 61 serves as input to translator 62, which outputs a translated application or, more simply, "translation" 63 which is stored for later use. In the simplest type of embodiment of translator 62, the target machine instruction sequences that comprise translation 63 are, for practical purposes, the same as would be used by a software emulator.

Figure 7:
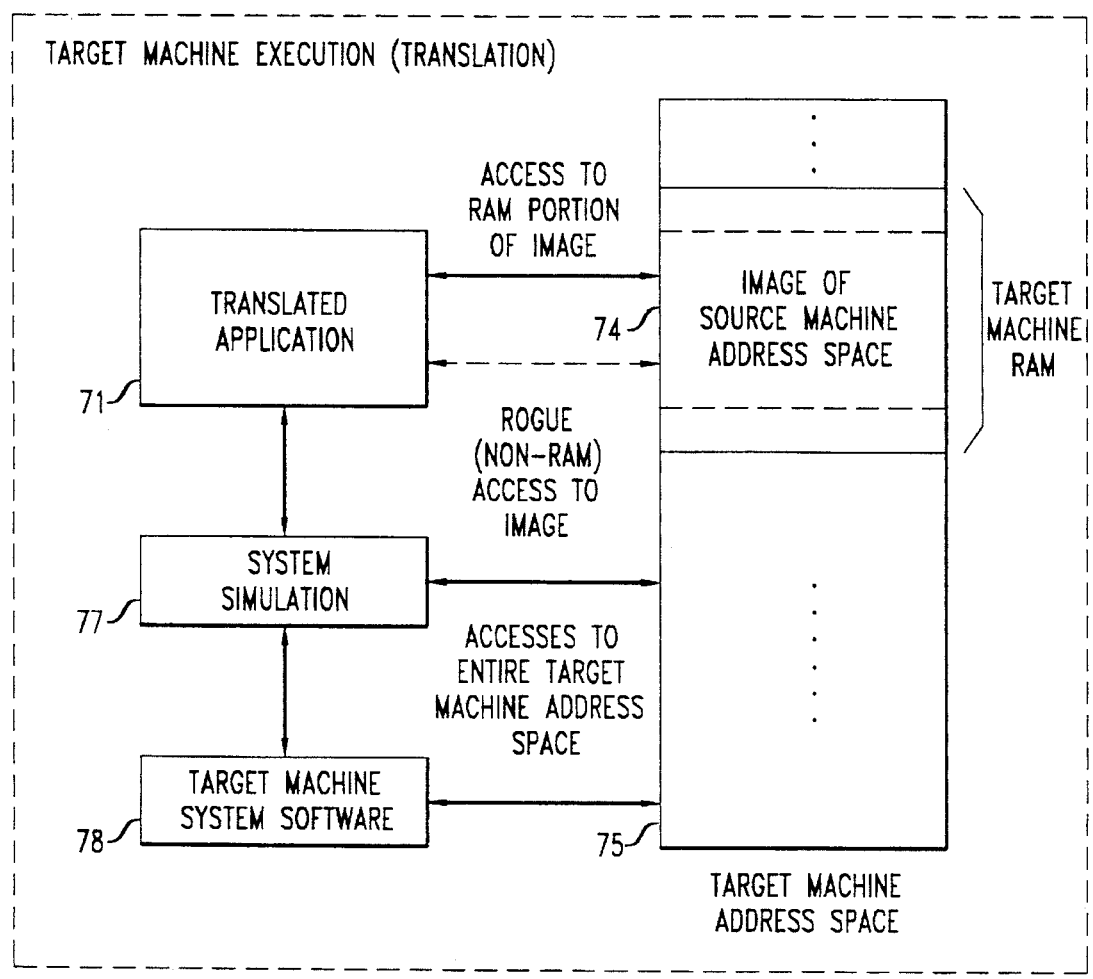
FIG. 7 is a logical view of one form of the run-time phase of object code translation.

The run-time execution of translation 63 is depicted in FIG. 7, where it is referenced as 71. Since, again at least in the simplest case, the instruction sequence is virtually the same as that in the software emulation case, the interaction between the executing instructions and the target machine are also virtually the same. Thus, in particular, translated application 71 accesses an image 74 of the source machine address space within target machine address space 75. System calls are handed over to a system simulation 77 which, in turn, accesses target machine address space 75 either directly or via target machine system software 78. And, as before, attempts by rogue programs to access locations in the source machine address space image outside of the ordinary RAM portion of the image will not, in general, result in the desired functionality being carried out.

It is opportune at this point in the description to describe the translating and target computers in further detail.

Figure 2:
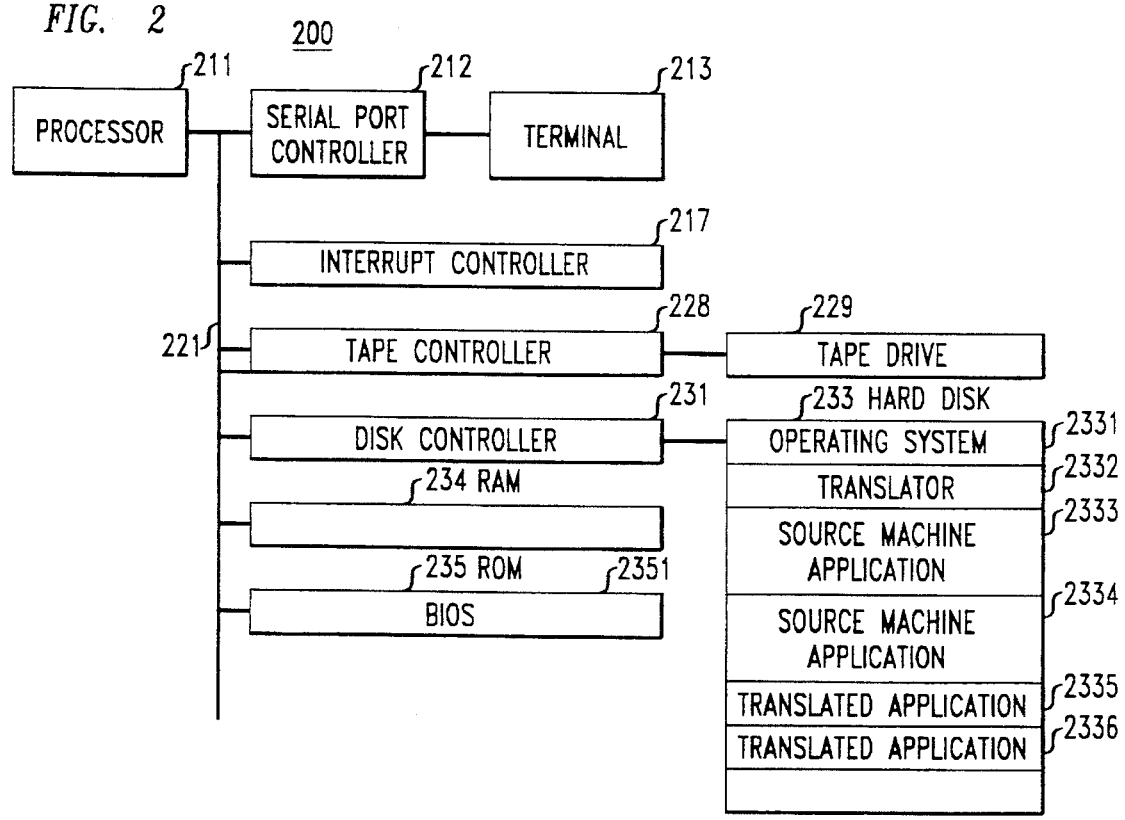
FIG. 2 is a block diagram of an illustrative translating computer.

In particular, FIG. 2 depicts an illustrative "translating" computer 200 on which the off-line phase of the translation process, shown in FIG. 6, is illustratively carried out. Translating computer 200 is illustratively a minicomputer whose overall architecture is similar to that of source machine 100 and, indeed, to that of most modern day computers. There are some differences between computers 100 and 200, however.

For example, translating computer 200 does not include a display memory nor separate keyboard and mouse control. Rather, all user interfacing is illustratively carried out via a serial port controller 212 which is connected to a conventional computer terminal 213. Additionally, the system does not include a floppy disk memory. Rather, as is typical in the minicomputer environment, software and/or data are loaded into, and output from, the computer by way of a magnetic tape drive 229 which is controlled by a tape controller 228. All other components of translating computer 200 have corresponding components in source computer 100 and bear reference numerals that have the same last two digits.

In addition to operating system 2331 of the translating computer 200, FIG. 2 further shows those files in hard disk unit 233 of translating computer 200 which are particularly relevant to the translation process. In particular, hard disk unit 233 stores translator 2332—corresponding to translator 62 of FIG. 6—which is executed as an application on this computer to carry out the off-line phase of the translation process depicted in FIG. 6; two source machine applications 2333 and 2334—corresponding to source application 61 of FIG. 6—which serve as input to translator 2332; and, finally, two translated applications 2335 and 2336—corresponding to translated application 63 in FIG. 6—which represent the output product of translator 2332 as the result of its processing of source machine applications 2333 and 2334, respectively. Illustratively, translator 2332 is designed to create translations intended for execution not on computer 200, but rather on a third, target machine—illustratively computer 300 shown in FIG. 3 and described hereinbelow. Thus, neither source machine applications 2333 and 2334 nor translated applications 2335 and 2336 can execute on translating computer 200. Rather, as far as computer 200 is concerned, they simply constitute input and output, respectively.

Figure 3:
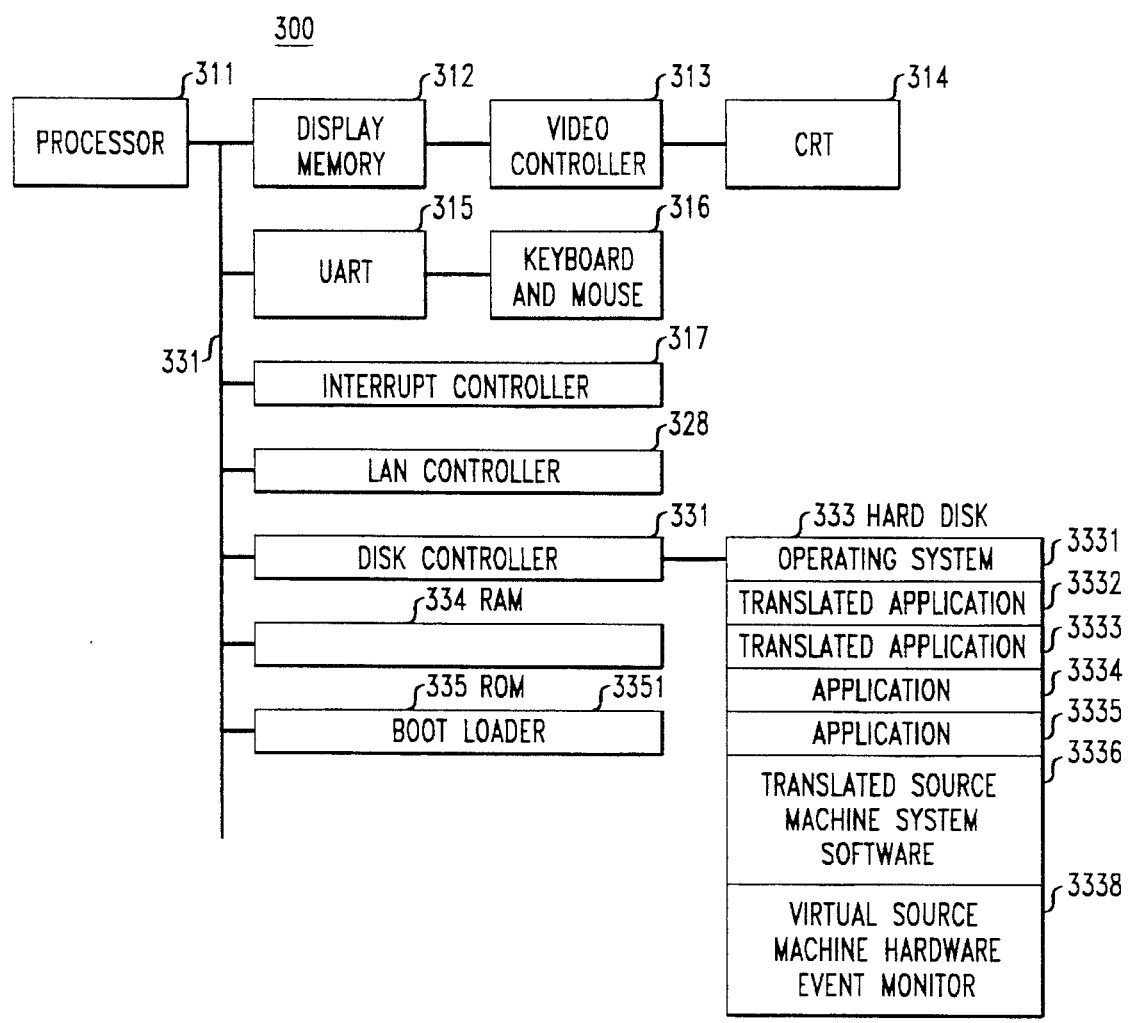
FIG. 3 is a block diagram of an illustrative target computer.

FIG. 3 depicts an illustrative target computer 300 on which the translated applications execute as shown in FIG. 7 (and also, as described below, in FIG. 8). Target computer 300 is illustratively a graphics workstation. Inasmuch as target machine 300 is to perform functions which mirror those performed on source machine 100, the two computers, not surprisingly, contain many similar components which, again, bear reference numerals having the same last two digits. Also again, however, there are some differences.

In particular, target computer 300, like translating computer 200, does not include a floppy disk unit. Its connection to the outside world is made by way of a local area network (LAN) by way of LAN controller 328. The other principal difference is that ROM 335 does not include a complete BIOS but, rather, only a boot loader 3351, as described above.

In addition to operating system 3331, FIG. 3 further shows those files in hard disk 333 of the target computer which are particularly relevant to the run-time portion of the translation process as depicted in FIG. 7. In particular, hard disk 333 stores the two translated applications 3332 and 3333 output by translating computer 200—corresponding to translated applications 2335 and 2336 of FIG. 2, translated application 63 of FIG. 6, and translated application 71 of FIG. 7. Also illustratively stored on hard disk 333 are two applications 3334 and 3335 which have been compiled for execution on target machine 300.

Other files shown in hard disk 333 are discussed at a more opportune point hereinbelow.

TRANSLATION OF SYSTEM SOFTWARE

Figure 8:
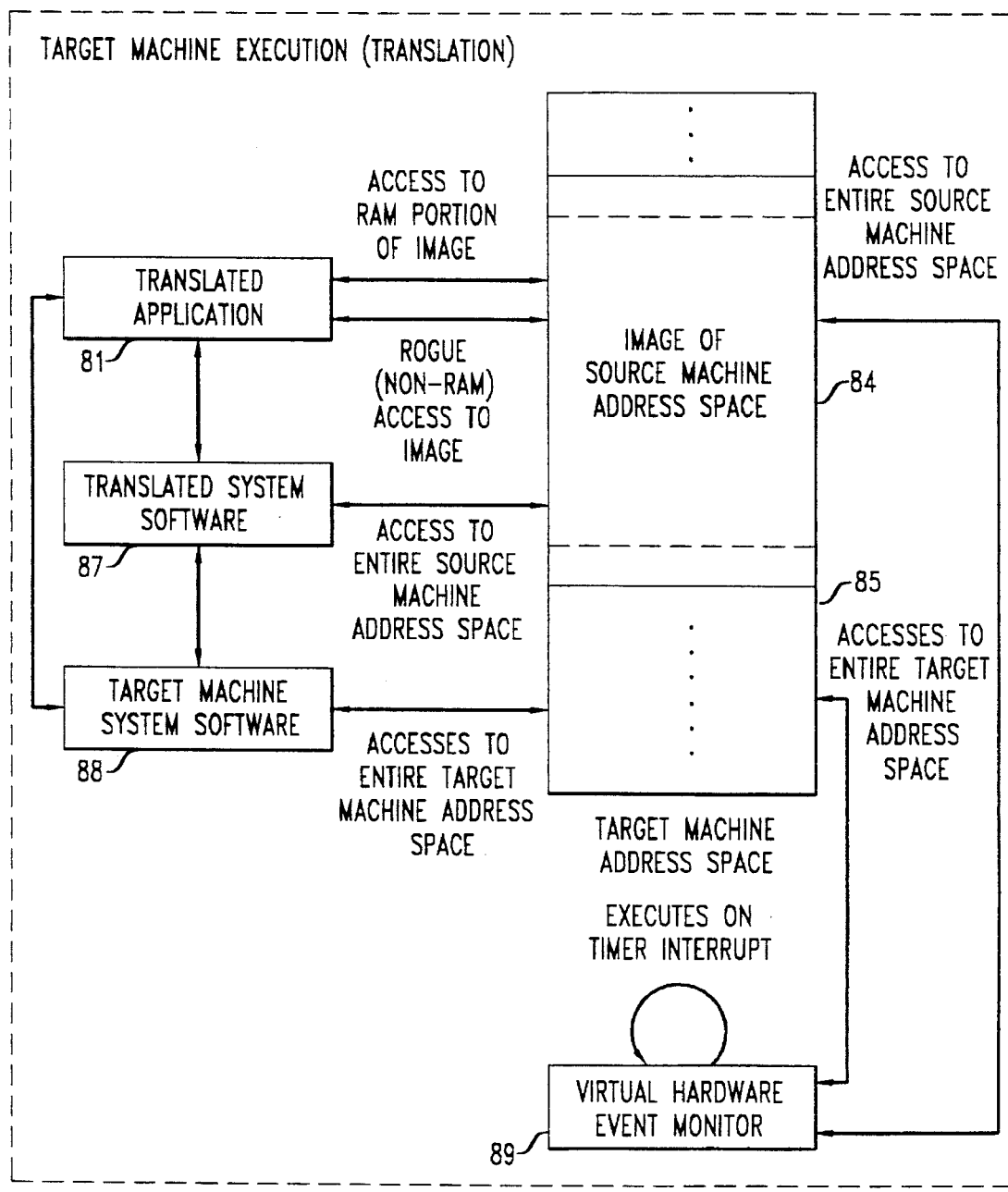
FIG. 8 is a logical view of a second form of the run-time phase of object code translation.

FIG. 8 depicts an alternative translation arrangement, which embodies the invention set forth in U.S. patent application Ser. No. 07/280,767 filed of even date herewith in the names of J. C. Goettelmann, R. G. Hiller, I. J. Krantzler, C. J. Macey and M. L. Tuomenoksa now abandoned and assigned to the same assignee. As before, the translated source machine application program 81 accesses an image 84 of the source machine address space. Now, however, the system software which serves the translated application, instead of being a simulation, is, at least in part, a translation 87 of at least portions of the source machine system software. Indeed, this translation of the source machine system software is created by subjecting the source machine system software to the very same translation processing as the application, i.e., the processing shown in FIG. 6.

It should be emphasized that it is not necessary to translate the entire body of source machine system software. For example, if a particular system service is provided virtually identically in both the source and target machines, one may forego translation of the code which implements the source machine version of that service in favor of linking the translated application to the target machine version thereof. Translated system software 87 may also invoke services of target machine system software 88 in much the same way that system simulations do currently. In other cases, it may be regarded as advantageous to simulate, rather than translate, a portion of the source machine system software and, again, link the translated application thereto. Moreover, elements of the source machine system software which are not expected to be accessed by an application need not be translated.

Translated system software 87 is stored as a library in target machine 300 (FIG. 3), where it bears the reference numeral 3336. As described in further detail hereinbelow with reference to FIG. 23, the translated application is linked to the translated system software prior to their being loaded for execution into RAM 334 of target machine 300. Thus when translated application 81 requests at least particular system services, it is the translated version of the source machine system software program implementing those services that is executed on the target machine, rather than a mere simulation, i.e., functionally rewritten version, thereof.

Translated system software 87 operates on the image of the source machine address space exactly as it did in the source machine. The semantics of the source machine system software are thus preserved identically. This provides significant advantages over the prior art approach of simulating, i.e., rewriting, the source machine system software.

In particular, descriptions provided by system software developers of how particular system services are, in fact, carried out in the software are often a) inaccurate in one or more (often subtle) ways and/or b) incomplete. As a result, system software simulations written on the basis of such descriptions—which are usually the only source available—may not embody particular functionalities existing in the original. Emulated or translated applications which invoke the simulated system services may thus not perform properly. By contrast, translating source machine system software ensures that all the nuances thereof—including, indeed, program bugs that the creators of rogue programs occasionally take advantage of—are preserved.

All addresses referenced by translated system software 87 are within image 84. That is, they are addresses of memory locations and devices in the source machine. The above-consideration relative to rogue programs is thus applicable to translated system software 87. In particular, the fact that the address space of the source and target machines are, invariably, different is not a problem to the extent that the addresses that are referenced correspond to non-device-related, or ordinary RAM, locations in both machines, because ordinary RAM locations are indistinguishable from one another. However, unless the differences in the two address spaces are accommodated, attempted accesses to locations associated with particular hardware devices, for example, will not, in general, be properly carried out.

Advantageously, a virtual hardware environment is provided in the target machine to deal with the foregoing. In particular, a component of the translation software—virtual hardware event monitor 89—is periodically invoked on a frequent basis, e.g., every 0.01 second, in response to a timer interrupt. As described in further detail hereinbelow, monitor 89 checks the status of all the locations in image 84 that correspond to source machine hardware devices and, if changes since the last check have occurred, it carries out the intended access in the target machine address space either directly or via target machine system software 88. In addition, monitor 89 also monitors those locations in the target machine address space corresponding to target machine hardware and updates any corresponding locations in image 84 so that any changes in the state of the target machine hardware will be made known to the translated application 81 and the translated system software 87.

The ability of translated system software 87 to serve translated application 81 in the identical manner as the application is served in the source machine relies on the ability of the designer of event monitor 89, in conjunction with the target machine system software 88, to exactly simulate the operation of the source machine hardware. Advantageously, the problems outlined above relative to the inadequacy of the documentation typically available for the source machine system software do not arise in the context of simulating its hardware. The reason is that the interfaces to the various hardware elements are well-defined and, indeed, the documentation available to the designer of event monitor 89 is the same as that available to, and relied upon, by the source computer hardware designer, this being the documentation supplied by the various manufacturers of the various hardware components. Thus as long as the designer of event monitor 89, in conjunction with the target machine system software 88, fully implements the features and characteristics of the source machine hardware devices, the hardware functionalities attempted to be invoked by the translated application 81 and the translated system software 87 can, in fact, be performed identically.

Figure 9:
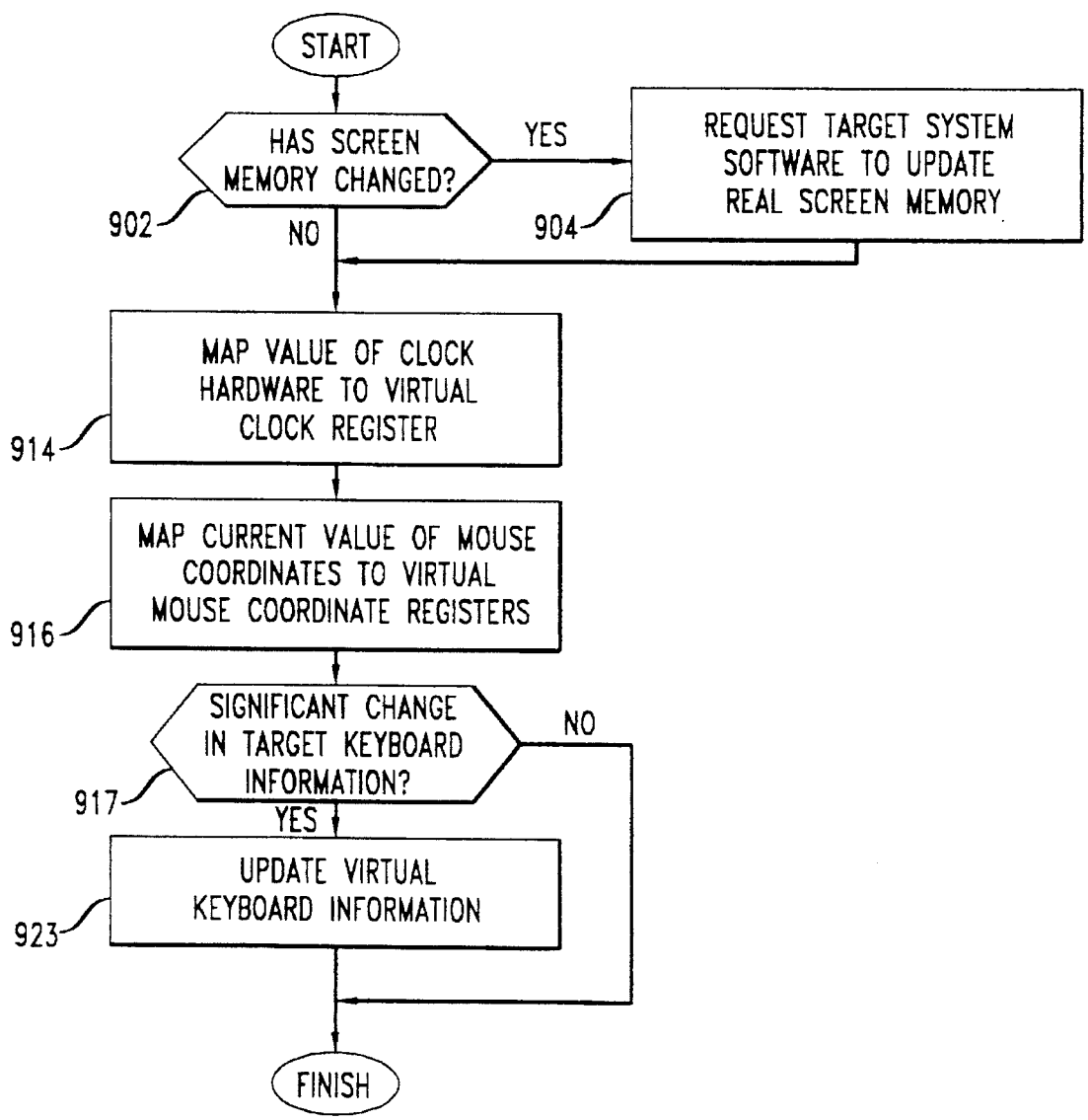
FIG. 9 is a flowchart depicting the operation of the virtual hardware event monitor shown in FIG. 8.

FIG. 9 is a flowchart of the operation of virtual hardware event monitor 89. In particular, monitor 89 begins at step 902 by determining whether the executing translated (application or system) software has made a screen change—by writing to the screen memory within image 84—since the last invocation of the monitor. This test can be performed in any of a number of ways, depending on the capabilities of the target machine. If there has been a change, monitor 89 invokes a service of target machine system software 88 to update, in the actual screen memory of the target machine, the values of the pixels that have changed.

Monitor 89 then proceeds to step 914, at which it copies the current value stored in the target machine clock register into the virtual clock register, i.e., the location within image 84 that corresponds to the source machine clock register. Similarly, at step 916, it copies the current values stored in the locations within the target machine at which the mouse coordinates are stored into the analogous locations within image 84.

Finally, the keyboard is considered at step 917. Specifically, monitor 89 checks a queue maintained by the target machine system software in which keyboard events are placed. If it finds that there has been a change since the last time this queue was checked, processing proceeds to step 923 at which this information is made known to the executing translated application. Illustratively, this is accomplished by simply placing the keyboard event information directly into a similar queue maintained within image 84. Alternatively, an interrupt procedure within the translated source machine system software could be invoked by monitor 89 to rut the information into that queue.

At this point, monitor 89 exits, to be re-invoked later.

Figure 10:
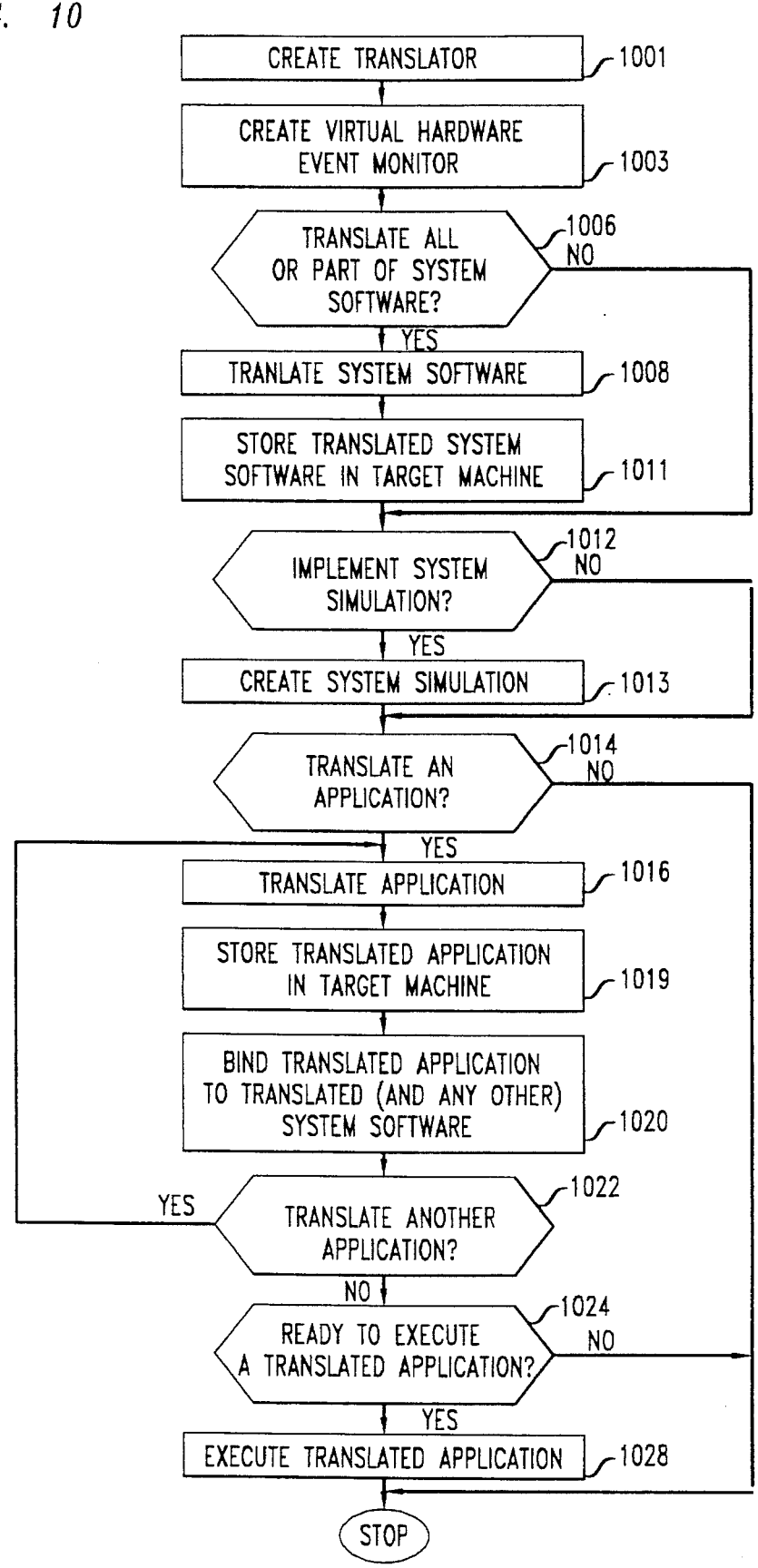
FIG. 10 is a flowchart depicting an illustrative overall process for creating and executing translated software.

FIG. 10 is a flowchart depicting an illustrative order of events for performing translation from the development of the translation software to the execution of translated software.

As indicated at 1001 and 1003, the first steps are to create a translator and virtual hardware event monitor. This is, of course, principally a computer programming task.

Once the translator and event monitor have been created, it is possible to proceed and a) translate all or part of the source machine system software and store it in the target machine, as indicated at 1006, 1008 and 1011; b) implement any desired system simulation software and store it in the target machine, as indicated at 1012 and 1013; and c) translate one or more applications, bind them to the translated and any other system software, and also store them in the target machine, as indicated at 1014, 1016, 1019, 1020 and 1022. If, as determined at step 1024, it is desired to execute a particular one of the translated applications on the target machine, the application can be directly executed as indicated at 1028.

More particularly, step 1028 is illustratively carried out by an application start-up procedure within target machine system software 88. This procedure serves the functions of invoking a target machine system service that will allocate memory space for image 84; loading translated application 81 into its proper place within the image, starting up monitor 89, essentially by instructing it to set up the aforementioned timer interrupt; and then passing control to application 81. When execution of application 81 is complete, the application start-up procedure functions to deactivate monitor 89, essentially by instructing it to de-activate its timer interrupt; release the memory space allocated for image 84; and return program control to target machine operating system 88.

TRANSLATOR

We now turn to a detailed discussion of an illustrative realization of that portion of the translation software that performs the actual translation in accordance with the principles of the invention, depicted as translator 2332 in FIG. 2 and translator 62 in FIG. 6.

The principal advantage of translation over software emulation is the fact that the time that would otherwise be consumed in decoding and mapping is eliminated, resulting in a significant performance improvement—typically about 3 to 1. Disadvantageously, however, the translated software typically requires vast amounts of storage space—typically a 15-to-25-fold increase over the original program code— due to the above-mentioned expansion of program code that results from the need to replicate explicitly the primary and side effects of the source machine instruction set. An example of how source machine code expands when the side effects are made explicit is shown in the first two columns of FIG. 11. This expansion of the program code, and its attendant requirement of large amounts of storage and slower execution, has, to this point, rendered object code translation an essentially unused alternative.

Figure 11:
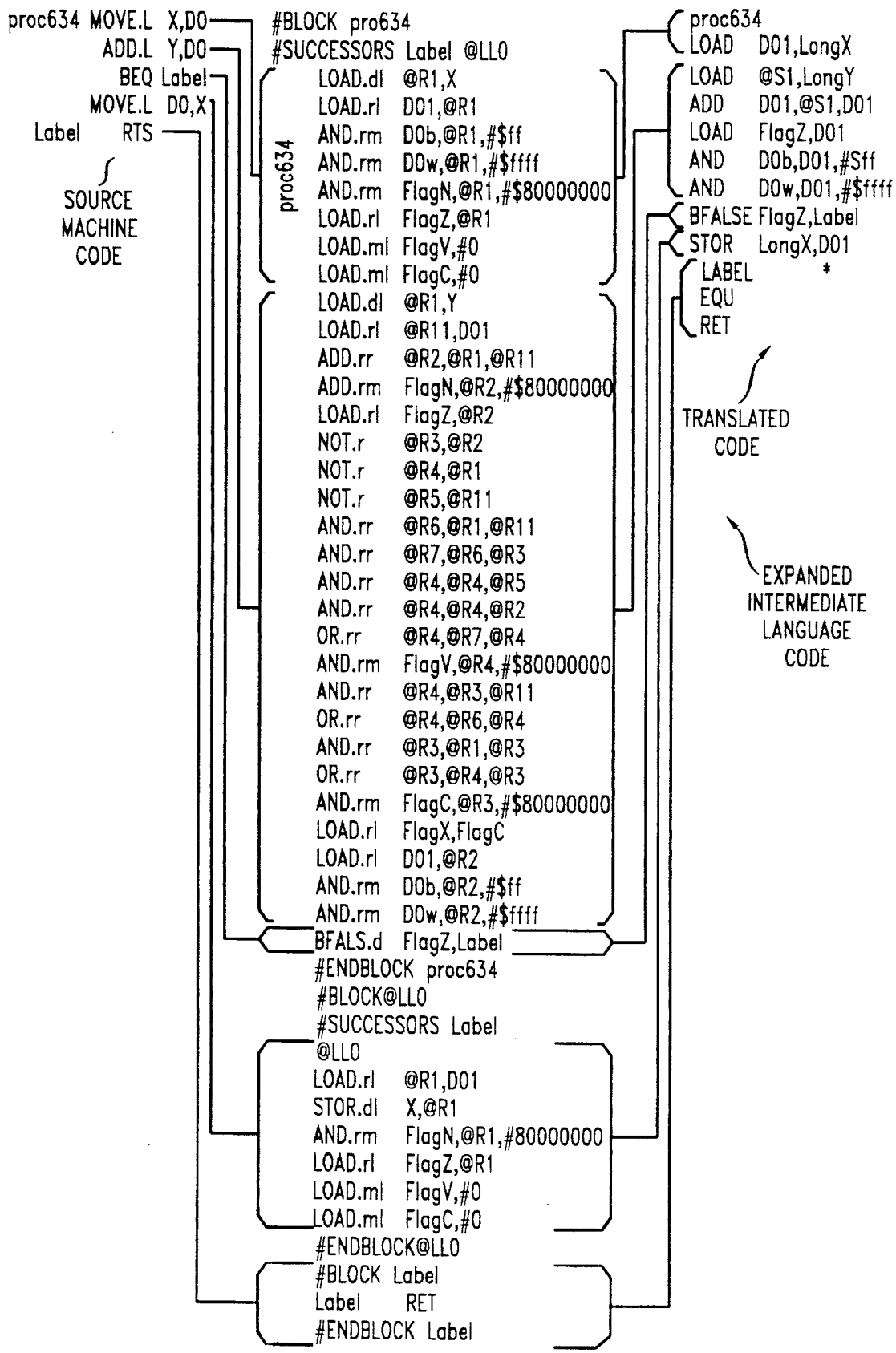
FIG. 11 shows how a fragment of a source computer assembly language code is expanded during the parsing phase of the translator and thereafter compressed during the optimization phase thereof.

However, in accordance with the present invention, it has been recognized that an object code translation having dramatically improved performance and reduced size can be achieved by analyzing the expanded program code and eliminating instructions that are, in fact, unnecessary for proper program execution. Indeed, if this is carried out in accordance with various features and aspects of the invention, as described hereinbelow, the resulting set of instructions may not require significantly more storage than the source machine application code. The third column in FIG. 11 illustrates the degree of reduction that these optimization techniques can yield.

Figure 12:
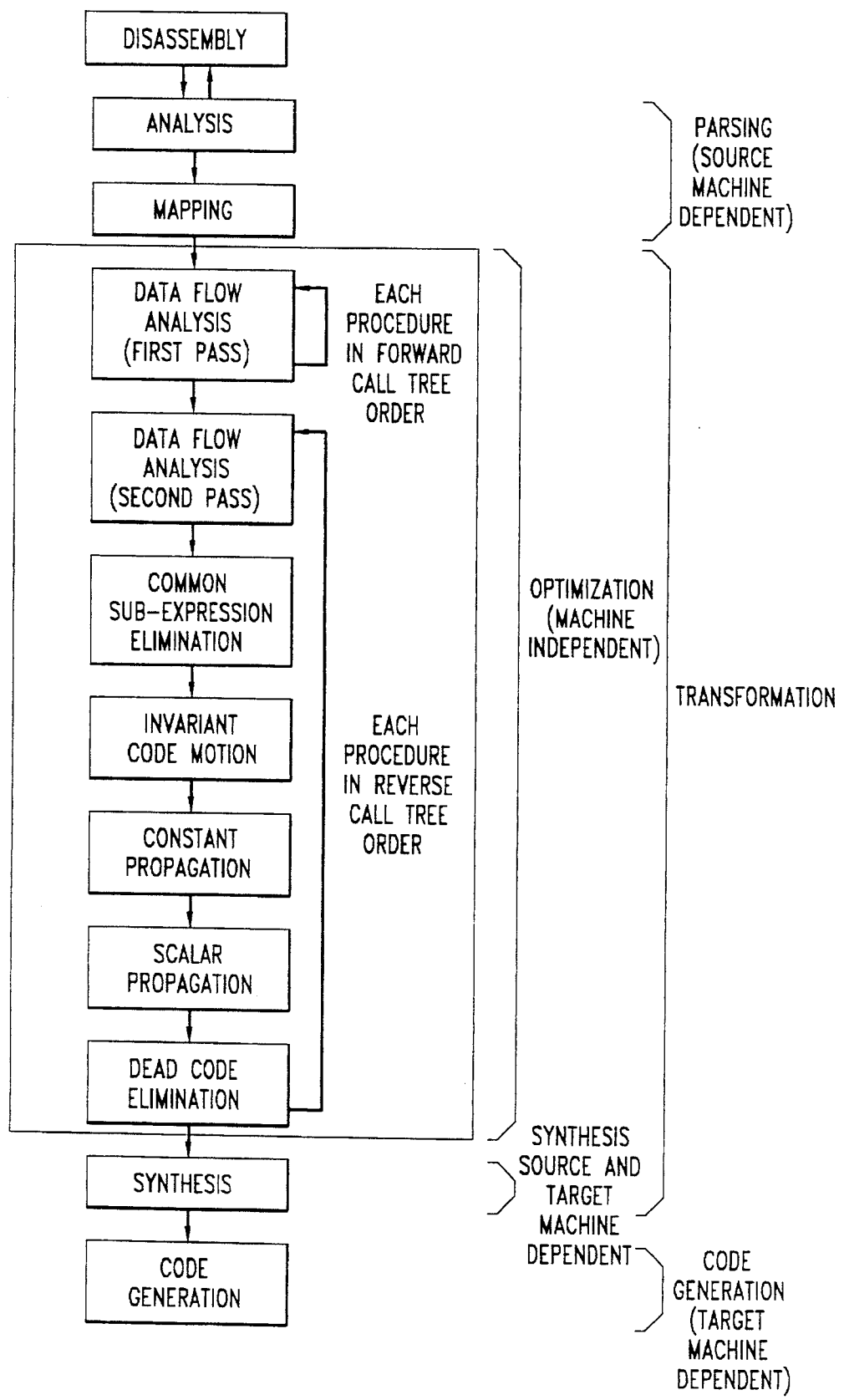
FIG. 12 is a flowchart depicting the components of an illustrative translator used to implement the invention.

FIG. 12 presents an overview of the processing performed by the translator to carry out the translation in accordance with the invention. The translation process is similar in many respects to a conventional compiler process and, as such, has three principal components: parsing, transformation and code generation. In particular, the parsing component reads the input application software or system software object code and converts it into an intermediate language representation suitable for further, machine-independent processing. The transformation component then reduces the size of the intermediate language code by eliminating redundancies and unnecessary code. Finally, the code generation component converts the intermediate language representation to the object language of the target machine.

These three components will now be described in turn.

Parsing

The parsing component has three phases: disassembly, analysis and mapping.

Disassembly involves the straightforward decoding of an individual instruction of the object code and conversion thereof to assembly language form, both the decoding and conversion being carried out in accordance with known, conventional techniques. The analysis phase, in turn, is responsible for managing the disassembly process.

Figure 15:
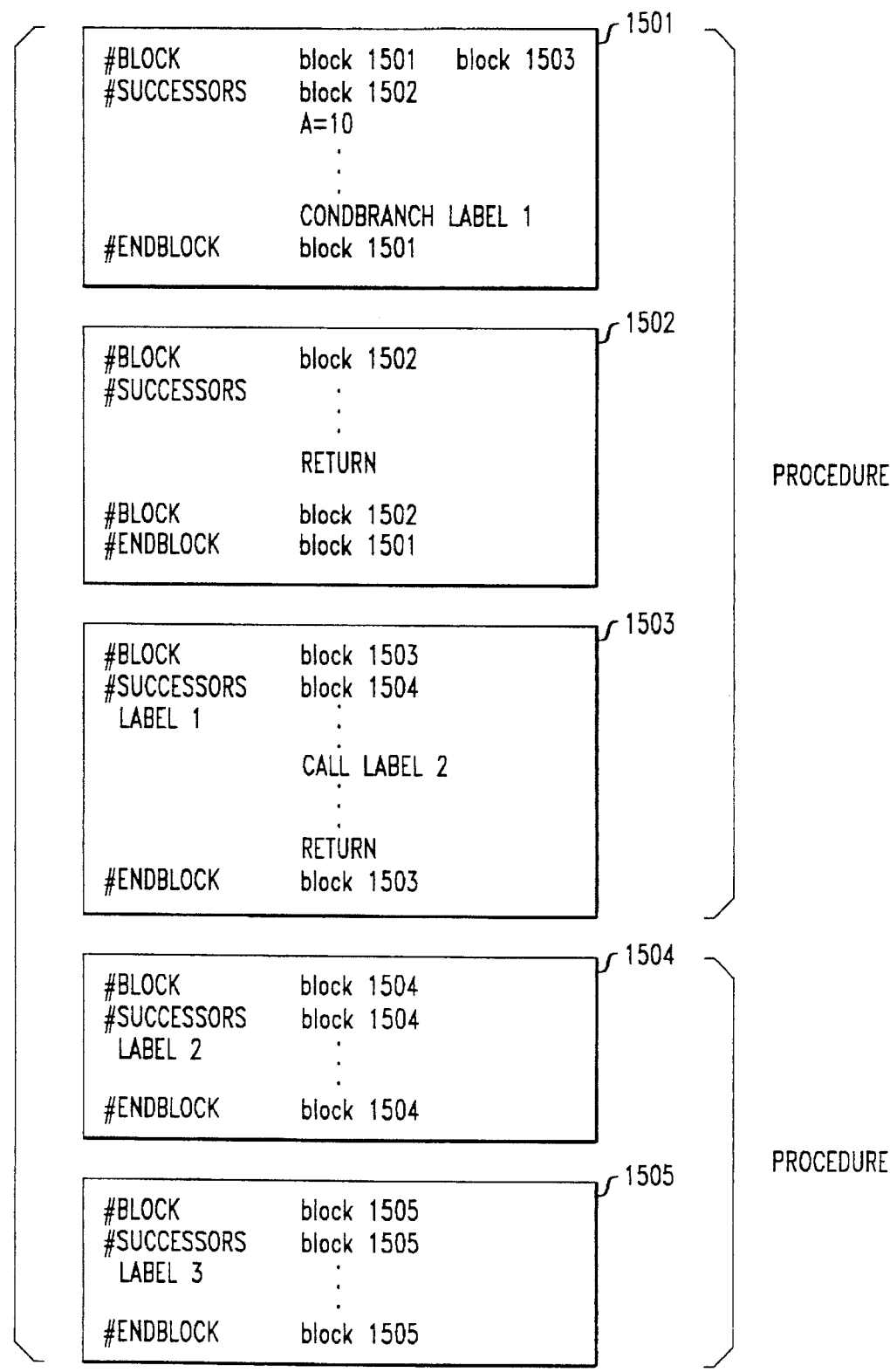
FIG. 15 is a graphical depiction of a number of basic blocks combined into so-called procedures.

The initial task of the disassembly/analysis is to create an assembly language representation of the input program divided into so-called basic blocks. A basic block is a sequence of instructions that has exactly one instruction at which control can enter the sequence during execution and exactly one instruction at which control leaves the sequence during execution. During the analysis, each basic block is annotated with comment lines identifying a) an arbitrarily selected name for the basic block, b) the beginning of the basic block, c) the end of the basic block, and d) the so-called "successors" of the basic block, these being basic blocks to which flow of control can be directly passed. (A single comment line is illustratively used to effect both a) and b).) A number of skeleton basic blocks annotated as just described, and grouped into so-called "procedures" as discussed more fully below, are shown in FIG. 15.

Figure 14:
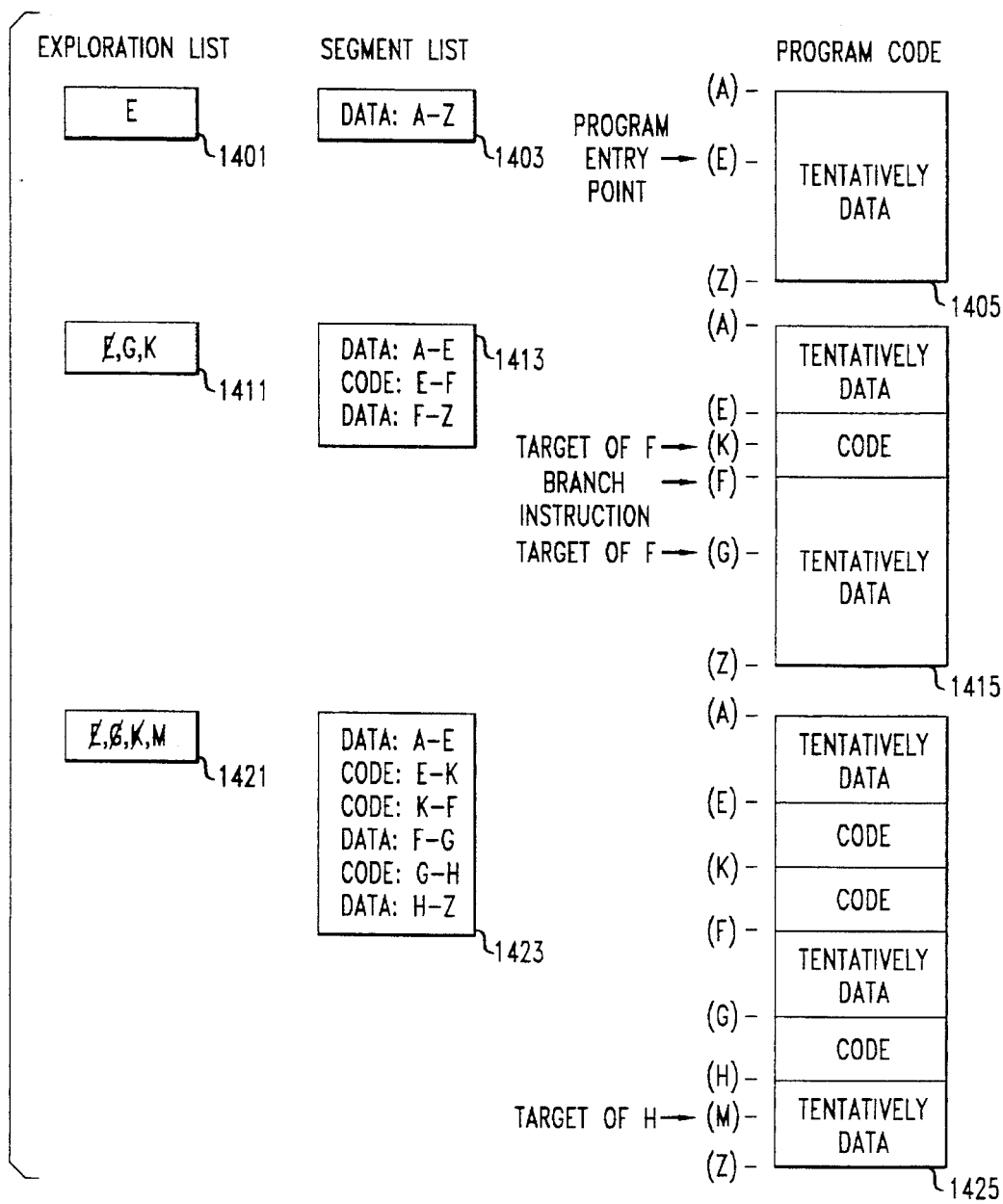
FIG. 14 shows how the parsing component of the translator divides an application being translated into so-called basic blocks.

The process of identifying the basic blocks is carried out by creating a so-called segment list, which contains the starting and ending locations of segments of the program which are identified as being either code or data. Initially, the entire program, denoted at 1405 in FIG. 14, is tentatively identified as a data segment. Thus, as denoted at 1403 in FIG. 14, the segment list initially contains a single entry, which contains the starting and ending locations of the entire program, denoted as "A" and "Z", respectively. As sections of code are discovered as the analysis proceeds, they are "split away" from the tentatively-identified-as-data segments which contained them and are re-classified as "code" in the segment list. Once this processing has been completed, each of the identified code segments is guaranteed to be a basic block.

Figure 13:
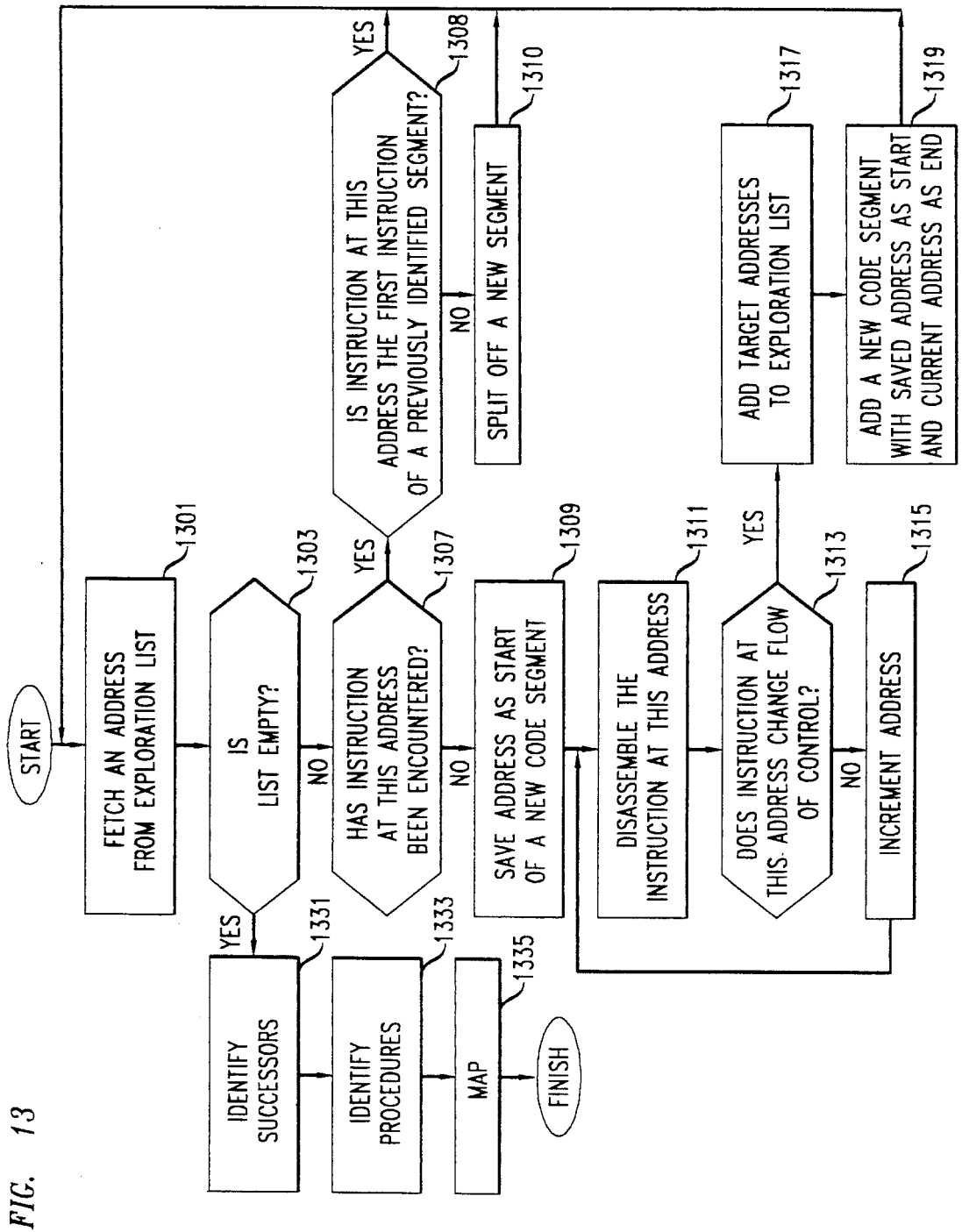
FIG. 13 is a flowchart depicting the parsing component of the translator.

FIG. 13 is a flowchart of the entire parsing component of the translator, with the majority of that flowchart being directed to the identification of code and data segments and thus, ultimately, of the basic blocks. Indeed, as will be appreciated after FIG. 13 is fully described, step 1311 carries out the disassembly; step 1335, the mapping; and the remaining steps, the analysis.

The processing begins at step 1301 by fetching an entry from a so-called exploration list which is a list of known basic block starting points. Initially, the exploration list is a list of addresses of entry points for the object code program, i.e., locations in the object program that may receive control when execution of the program begins. Normally, an application has only one entry point. However, system software, which may be also translated, typically has many entry points, i.e., all of the various locations where an application might call it. The initial exploration list is denoted at 1401 in FIG. 14 and in this case contains a single entry, viz., the location of the program entry point denoted "E". As various other basic block starting points are identified, in a manner described below, they are added to the exploration list.

if, as determined at step 1303, the exploration list is empty, processing to identify the code and data segment blocks is complete. Otherwise, a further test is made at step 1307 to determine whether the instruction at the address under consideration has, indeed, already been encountered, the possibility of this occurring being explained at a more opportune point hereinbelow.

If, in fact, the instruction under consideration has not been previously encountered, it is, by definition, the first instruction of a newly-identified basic block and its address is saved for later use. Initially, then, it is location "E" that is so saved.

Processing then continues at step 1311, at which point the instruction is disassembled so that the subsequent step, 1313, can determine whether the instruction changes the flow of control, i.e, is a branch, call or return. If it does not, the end of the segment has not yet been found. The address is incremented at step 1315 and steps 1311 and 1313 are repeated for the next instruction.

Ultimately, an instruction that does change flow of control is encountered. As indicated at 1415 in FIG. 14, that instruction is, in this example, a branch instruction at location "F". Step 1317 adds the addresses of the instructions to which the current instruction may transfer control to the exploration list since each such address is, by definition, the first instruction of a respective basic block. In this example, locations "G" and "K" are instructions to which flow of control can pass from the branch instruction at location "F". Step 1319 then uses the address saved at step 1309 and the current address to create a new code segment entry in the segment list. Thus as indicated at 1413, the segment list now contains three entries, tentative data segments at locations "A–E" and "F–Z" and a code segment at locations "E–F". It is too early to say that the newly created code segment at locations "E–F" is a basic block because it may be later discovered that an instruction within the segment is the target of, say, an as-yet-unencountered branch instruction and is thus the first instruction of its own basic block. Indeed, as will be seen, location "K" is the location of just such a target instruction.

At this point, processing returns to step 1301 to process another entry from the exploration list, now the entry "G". The same processing steps will be followed in this case, resulting in the identification of another code segment at locations "G–H" and the adding to the exploration list of location "M", the instruction at that location being a target of the instruction at location "H".

Processing again returns to step 1301. Note, however, that location "K" is within the code segment at locations "E–F". Thus the result of the test at step 1307 is now "YES" because location "K" was encountered during the processing that identified the code segment at locations "E–F".

Step 1308 then determines whether the current instruction is the first instruction of an already-identified segment. This would occur if location "K" had been previously placed on the exploration list as the result of it being the target of an instruction that was encountered prior to the instruction at location "H". In that case, nothing more would need be done, and processing would again return to step 1301. In this case, however, location "K" has not yet been identified as the first instruction of an "F" is split off at step 1310 and processing again returns to step 1301.

Ultimately, it will be discovered at step 1303 that the exploration list is empty. Any segments not identified as code by this point in the processing are data, i.e., non-instructions, because no path in the flow of control was discovered by which such instructions could be possibly reached for execution. At this point, moreover, all code segments are, by virtue of the methodology employed, guaranteed to be basic blocks.

The processing now proceeds from step 1303 to step 1331 at which the aforementioned successors of the basic blocks are identified. This is readily accomplished by simply examining the last instruction of each basic block and determining the basic blocks to which flow of control can pass. So-called procedures of the original program are then identified at step 1333. This is achieved by first identifying individual ones of the basic blocks as being so-called "procedure head blocks", this being a basic block whose first instruction is either a) an entry point (as described above) or b) the target of a call instruction. A procedure is comprised of all blocks reachable (through a sequence of successors) from a so-called procedure head block a) which are not themselves procedure head blocks and b) to which flow of control does not pass through any intermediate procedure head block.

An illustrative grouping of basic blocks into procedures is illustrated in FIG. 15 which shows a plurality of basic blocks 1501 through 1505. Note that each basic block has a comment line of the form "#BLOCK (block150x" denoting both the beginning of the basic block and its name; a comment line of the form "#ENDBLOCK block150x" denoting the end of the basic block and, again, its name; a comment line of the form "#SUCCESSORS 150a, 150b, etc" denoting the successors of the basic block; and, of course, the program code. Only the instructions which alter flow of control are explicitly shown (in program pseudocode) in the FIG.

The first instruction of basic block 1501—"A=10"—is an entry point. Thus that basic block is a procedure head block. All of the remaining basic blocks are reachable from block 1501. In particular, basic blocks 1502 and 1503 are reached via a conditional branch to LABEL1. If the branch is taken, flow of control passes to LABEL1, which marks the first instruction of basic block 1503. Otherwise, control "falls through" the branch to the first instruction of basic block 1502. Block 1504 is reached by a call to LABEL2 from basic block 1503, that label marking the first instruction of basic block 1504. Finally, basic block 1505 is reached both by a fall-through from basic block 1504 and from itself via the conditional branch to LABEL3.

Successors 1502 and 1503 are part of the procedure headed by basic block 1501. However, basic blocks 1504 and 1505, although they are also successors to basic block 1501, belong to another procedure. First of all, basic block 1504 qualifies as a procedure head block in its own right since it is the target of a call. Moreover, flow of control to basic block 1505 from basic block 1501 passes through an intermediate procedure head block, viz., basic block 1504. Hence basic block 1505 is not in the procedure headed by basic block 1501. Rather, it is only in the procedure headed by basic block 1504.

Step 1333 of FIG. 13 completes the analysis phase of the parsing component. The last parsing step—mapping—is then performed at step 1335. This is the process of substituting, for each disassembled instruction, an equivalent sequence of operations—including the side effects—expressed in terms of a machine-independent intermediate language. The mapping process performed at step 1335 is thus quite similar to the mapping performed during conventional software emulation, as described above.

It is appropriate at this point to more fully describe what is meant by the term "side effect" and how the mapping process should be managed in order to, indeed, replicate all of the semantics of the side effects of the source machine instruction set in the intermediate language representation.

Definitionally, an instruction set is the ensemble of all instructions that are available to the programmer of a computer. Each instruction has a syntax, which defines the form of the instruction, and semantics, which are the operations which are performed upon the execution of the instruction. The semantics, in turn, include both primary and side effects.

The primary effect may generate a data value, which may be thought of as "primary information". Thus, for example, the primary effect of an ADD instruction is the addition of two quantities. Alternatively, the primary effect may be a non-data operation, for example, a change in the flow of control, as in a JUMP.

A side effect is any effect of an instruction that is a) other than its primary effect and b) is potentially useful at a later point in the program execution. A side effect may, for example, generate various pieces of "secondary" information. Thus, for example, side effects of arithmetic instructions often include the setting of condition code bits, the values of those bits being indicative of properties of either the arithmetic result (such as whether that result is zero or non-zero) or of the operation itself (such as whether the result overflowed). Alternatively, a side effect may relate not to the generation of secondary information, but rather to specifics of the semantics of an instruction. An example is whether the high-order half-word of a word-length register is or is not preserved when a half-word operation is performed on the register.

It may be noted that a particular side effect may or may not have been intended by the processor design team. For example, it may turn out that, due to an error in the processor firmware, a particular condition code bit that is supposed to always be reset upon the execution of a particular instruction may be left un-reset when that instruction is executed with particular operand values.

The manner in which side effects are used in a program are varied. For example, the value of a condition code bit may be tested in the very next program code instruction to change flow of control. Or the value of the overflow condition code bit may be tested and, if it is found to have been set, an exception handler for overflow cases may be invoked. These are examples of routine uses of side effects which the processor design team provides because of their general utility. However, programmers often take advantage of particular side effects for other-than-originally-intended uses and, indeed, may take advantage of subtle side effects to this end.

An example of the case where a particular non-subtle side-effect is used for other than its originally intended purpose is the setting of the carry condition code bit upon exit of a system call as a way of reporting back to the calling program that the system call failed. An example of a subtle side effect that may be used to advantage might be the fact that, when a half-word operation is performed on a word-length register, the high-order half-word of the register is preserved. This being so, a program may rely on this effect to pass data to subsequently executed portions of the program. In effect, the high-order half-word of the register functions as an extra half-word register. The mapping process must replicate all such side effects faithfully because the creator of the program being translated may have indeed relied on them in unforeseeable ways.

The strategy for mapping of side effects is as follows: During the creation of the translator mapping phase, each instruction of the source machine instruction set is analyzed to appreciate both its primary effect and all of its side effects. Initially, the processor reference manual or other documentation can be used to gather information about the side effects. A skeleton intermediate language code sequence can then be developed for each source machine instruction. This sequence includes intermediate language instructions which perform the primary effect of the instruction and the known side effects. For example, the skeleton for an ADD instruction will include individual intermediate language statements which calculate and set the various condition code bits. (Although both the source and target machines may have nominally similar side effects, the detailed semantics of the side effects may be different. For example, the MOVE instruction on one machine may set the zero and negative condition code bits while the equivalent instruction on the other machine may not affect the condition code bits at all. Thus in preferred embodiments, the skeleton sequence will explicitly replicate the source machine side effects rather than relying on the corresponding target machine side effects.)

Side effect peculiarities must also be taken into account. If, for example, a particular condition code bit—again through design or error—is not reset for particular operand values, this must be reproduced in the skeleton by providing code which, for example, tests those operand values and omits the setting of the condition code bit in the appropriate cases. In addition, any side effects which impact on the primary effect of the instruction being mapped must also be taken into account. Thus, for example, a half-word add must include the appropriate treatment of the high-order half-word of the word-length register, as in the example discussed above.

In addition, it should be noted that care should be taken to keep the intermediate language code which performs each side effect as independent as possible from that which performs each other side effect, as this provides the maximum number of potential opportunities for removing unnecessary code (during the code elimination phase of optimization, as discussed below).

There is thus available to the mapping phase at translation time a skeleton intermediate language code sequence for each instruction in the source machine instruction set. Mapping then consists of adding to the intermediate language code listing already created a) code for fetching the operands of each instruction, b) the appropriate skeleton and c) code for storing the result of the instruction if necessary.

It may well turn out that during the development of the translator, particular side effects were not taken into account because they were neither documented nor obvious. Accordingly, applications which depend on such side effects will not perform as expected when translated. This necessitates iterative development wherein translated program failure points are discovered, the unaccounted-for side effects identified and the mapping process modified to take account of them.

Finally, it may be pointed out that the disassembly and mapping phases are source machine-dependent. Thus, a different disassembler and mapper must be created for each different source machine. This can be facilitated by reference to the manufacturer's instruction set manual. The analysis, however, is machine-independent since its function is essentially one of managing the disassembly.

Transformation

Referring again to FIG. 12, it will be seen that the next component of the translator, transformation, has two phases: optimization and synthesis.

In accordance with the invention, the principal function of the optimization phase is, as mentioned above, to analyze the expanded program code and eliminate instructions that are, in fact, unnecessary for proper program functionality. In preferred embodiments, more particularly, the analysis and instruction elimination are carried out globally. That is, the necessity or non-necessity of retaining or eliminating a particular instruction is determined on the basis of an examination of the entire program being translated (as opposed, for example, to only a basic flow block or procedure). This approach maximizes the amount of program code that can be identified as being, in fact, unnecessary. (Indeed, this is important because the expanded code is so voluminous that it is advantageous to exploit every opportunity to reduce its size.) Known optimization techniques—initially developed for compilers—are illustratively used to carry out this operation. Advantageously, such optimization techniques can actually improve the quality of the program by, for example, deleting artifacts that may have been created in a given application by the source machine compiler if that compiler did not, in fact, embody such optimization techniques. These artifacts may include, for example, unreachable code and unnecessary loads from, and stores to, memory.

The input to the optimization phase is the intermediate language representation of the source application annotated, as in FIG. 15, with all side-effects made explicit. A small section of actual such program code is shown in the middle column of FIG. 11.

In accordance with a feature of the invention, we have further realized that so-called data flow analysis techniques, heretofore developed and used in compiler technology, can be advantageously applied to the translation problem in order to perform the analysis and elimination of unnecessary instructions. Moreover, the data flow analysis is carried out in two parts, in accordance with a further feature of the invention, as discussed hereinbelow. Advantageously, the developed-for-compilers technique of definition-use chaining is illustratively employed to accomplish the data flow analysis. In particular, the object of the data flow analysis is to classify all mentions of variables in the intermediate language instructions as being either "definitions" or "uses". A "variable" is the name of a register (including condition code bits), memory location or stack location. A "definition" is an occurrence of a variable in an instruction in which the variable gets a new value. A "use" is any other occurrence of the variable, i.e., a place where the defined value is used. Each use, then, is a mention of a value created by some definition (or set of definitions) and, by examining the possible flow of control paths through a procedure, the set of definitions which could generate the value in a particular use are deduced. Thus looking ahead briefly to FIG. 21, the instruction "Z=10" is a definition of the variable Z while the subsequent instruction "X–Z" is a use of variable Z. The process of associating definitions with uses is, in fact, the aforementioned definition-use chaining and the information thus generated is referred to herein as "the data flow results".

In accordance with features of the invention, the data flow results are thereupon used to perform a number of developed-for-compilers transformations, illustratively including "common sub-expression elimination", "invariant code motion", "constant propagation", "scalar propagation" and "dead code elimination".

Dead code elimination, which is the last of the transformations to be performed, involves the removal of instructions involving definitions which have no uses. It is the most effective of the transformations (in terms of the number of instructions that can be eliminated during a translation optimization) because the expanded intermediate language version is replete with instructions devoted to the calculation of side effects which are never used. This is illustrated in FIG. 11 which shows, in three columns, how five lines of source-machine program code are expanded to thirty-nine lines of intermediate language code and, after dead code elimination, is reduced to ten lines of translated code.

The other transformations precede dead code elimination when the optimization is actually carried out. As will be seen, each of them improves program performance. Moreover, the constant propagation and scalar propagation transformations have the further salutary effect of rendering certain definitions superfluous and therefore removable by dead code elimination. Such transformations are effective in inverse proportion to the quality of optimization used in the compiler which produced the original source machine code. Indeed, until quite recently, it was not common to include optimization techniques in commercial compilers. Hence, these transformations, in combination with the highly efficacious dead code elimination process described above, will be quite efficacious in the translation of the vast majority of programs commercially available today. Moreover, since these transformations use the data flow results that need to be generated for dead code elimination in any event, their introduction into the optimization process entails relatively little additional computational time.

Common sub-expression elimination involves the removal of redundant calculations of the same value. A common sub-expression is identified by determining that a given pair of definitions is calculated by performing the same operations on the same variables, provided that the variables in each calculation have the same associated definitions as the corresponding variables in the other calculation. Thus consider the initial program code shown in FIG. 16 in which register. X is assigned the results of adding registers A and B and later register Y is also assigned the results of adding registers A and B, and assume there are no intervening assignments of registers A or B. It is not optimal to perform this addition twice. Accordingly, a variable @ 1 is created to hold the results of the addition of variables A and B. That addition is then replaced in the assignments to variables X and Y by a reference to variable @ 1.

Figure 17:
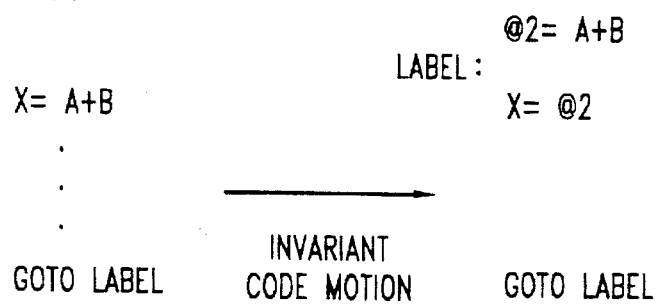

Invariant code motion involves the case where the calculation of a value is performed within a loop in the flow of control. If the uses involved in the calculation only have associated definitions which are outside the loop, the calculation will be invariant within the loop. That is, the same value will be calculated in every iteration of the loop. Accordingly, the calculation can be moved ahead of the loop so that it is only performed once and execution time (although not code size) is improved. Thus consider the initial program code shown in FIG. 17. Register X is assigned the result of adding registers A and B within the loop defined by LABEL. Assume, however, that there are no assignments to registers A or B within the loop, i.e., the uses of registers A and B in the calculation have no associated definitions within the loop. There is thus no need to perform the calculation for each pass through the loop. Accordingly, an assignment to a variable @ 2 is created outside the loop—where it will only be performed once—to hold the results of the addition of variables A and B. That addition is then replaced in the assignment within the loop by a reference to variable @ 2.

Figure 18:
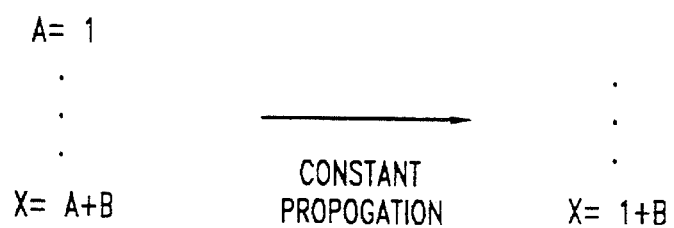

Constant propagation involves replacing a use with a constant if the use has only one associated definition and that definition, in turn, is an assignment of a constant to a variable. Thus consider the initial program code shown in FIG. 18. Here the value "1" is assigned to register A and a subsequent instruction "X=A+B" uses the contents of register A. In this case the reference to register A in the second instruction is replaced by the value "1" itself. The data flow results are thereupon updated to remove the association between the use and definition in question. The subsequent dead code elimination transformation, finding no uses for the definition, will delete it as superfluous.

Figure 19:
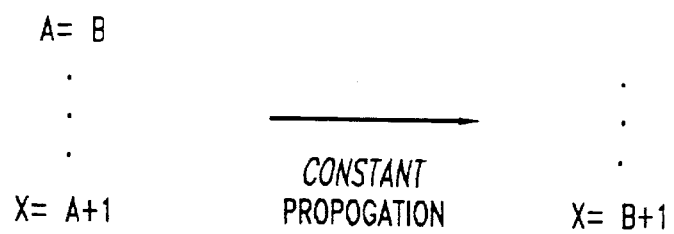

Scalar propagation is similar to constant propagation in that the use, again, has only one associated definition. Here, however, the definition constitutes the assignment of the value of a first variable (instead of a constant) to a second variable. Again, the use of the second variable can be replaced with a reference to the first as long as there is no intervening redefinition of the first variable. The data flow results are thereupon appropriately updated. Thus, consider the initial program code shown in FIG. 19. Here the contents of register B are assigned to register A and the subsequent instruction "X=A+1" uses the contents of register A. In this case, the reference to register A in the second instruction is replaced by a reference to the contents of register B (as long as there is no intervening assignment to register B). As before, the data flow results are updated, this time to remove the association between the use of register A and the definition in question (and, in order to keep the data flow results accurate, to add an association between the new use of register B and the definition associated with that use). The original definition may or may not become superfluous, depending on whether that definition has at least one other use for which there is, indeed, an intervening assignment. If there are none, that definition will be deleted by the (subsequent) dead code elimination.

As discussed in detail hereinbelow and, indeed, as shown in FIG. 12, the transformation component of the optimization phase processes the source application on a procedure-by-procedure basis in accordance with a feature of the invention. The reason for this is that the data-flow analysis techniques used for optimization have explosive growth in execution time and space as the size of the program unit being optimized increases. By limiting optimization to procedure-sized units, the growth problem can be kept to a manageable level. This approach means, however, that special account must be taken of the presence of calls within a procedure to other procedures. The reason is that definitions made in a first procedure may have uses in a second procedure called thereby and vice versa, and the definition-use chaining process must take account of this or the overall translation process will produce incorrect code.

One method for ensuring correctness in this regard is to blindly assume that every variable is both used and defined within every procedure call. Thus, for example, if a definition in the calling procedure is actually used in the called procedure (although not in the calling procedure), the blind assumption that every definition is used in the called procedure will ensure that the definition in question is not removed during dead code elimination. As an another example, assume that a definition in the calling procedure is the assignment of a constant value to a register and the contents of that register are used in the calling procedure after a call. Assume, further, that the called procedure redefines the contents of the register. By virtue of the blind assumption that everything is defined by the called procedure, we ensure that this use in the calling procedure will not be associated with the definition appearing therein ahead of the call, and we thus prevent an erroneous application of constant propagation.

On the one hand, as noted above, this approach guarantees correctness. That is, there will be no elimination of code which, although it appears to be unnecessary in the local context, is in fact needed in some more global context. On the other hand, such assumptions are usually excessively pessimistic and greatly reduce the effectiveness of the optimization.

In accordance with a further feature of the invention, a more efficacious approach is to use a so-called call tree to guide the optimization process. A call tree, in particular, is a static reflection of the procedure-calling behavior of the program. The procedures at the entry points of the program are the "roots" of the tree. (Normally an application has only one entry point and thus there is only one root, as would be intuitively expected.) Each procedure called by the root is a "branch" of the tree; each procedure called by a branch is a "sub-branch" of that branch; and so forth. Procedures which call no other procedures are called "leaves". The set of procedures that can be reached by one or more calls from a given procedure are its "descendants" and it, conversely, is their "ancestor".

Figure 20:
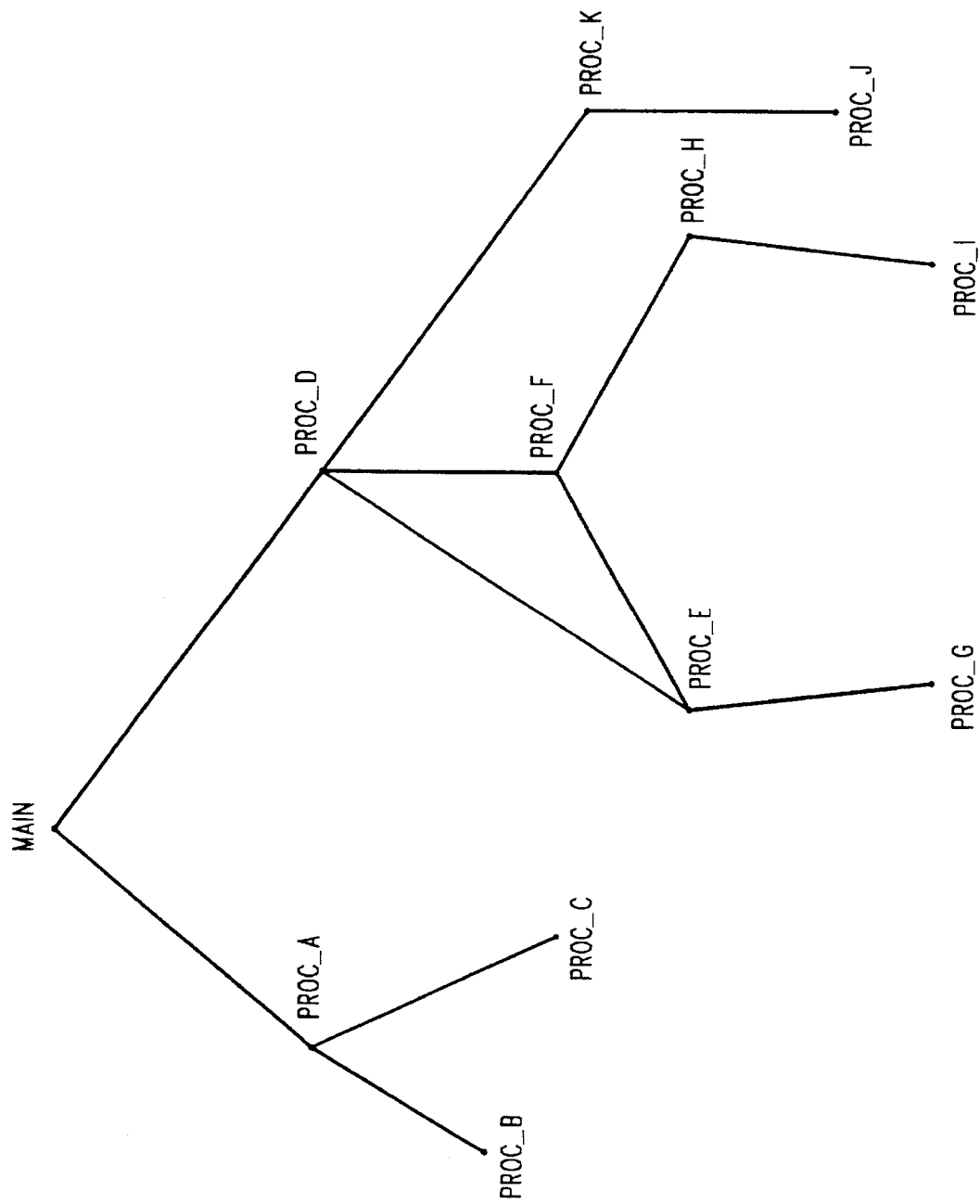
FIG. 20 is an example of a so-called call tree used by the optimization component of the translator in accordance with a feature of the invention.

FIG. 20 shows an illustrative call tree which has a procedure known as "MAIN" as its root and a number of procedures known as PROC_A, PROC_B, ... PROC_K as its descendants. Thus, for example, MAIN calls PROC_A which, in turn, calls PROC_B and PROC_C. As another example, PROC_D calls PROC_F which, in turn, calls PROC_E. The latter, recursively, calls PROC_D.

The data flow analysis step processes all procedures twice—the first time in "forward" call tree order, i.e., from root to leaves, and the second time in "reverse" call tree order, i.e., from leaves to root. Thus an illustrative order of processing in the first pass is MAIN, PROC_A, PROC_B, PROC_C, PROC_D, PROC_F, PROC_E, PROC_H, PROC_G, PROC_I, PROC_K and PROC_J. An illustrative order of processing in the second pass is PROC_B, PROC_C, PROC_A, PROC_G, PROC_I, PROC_H, PROC_E, PROC_F, PROC_J, PROC_K, PROC_D and MAIN. Note that the recursive arc from PROC_E to PROC_D is ignored in establishing these orderings. Indeed, when performing data flow analysis for portions of the call tree which are involved in such recursive cycles, the definition-use chaining, with respect to calls, may become extremely complicated. For this reason, the above-mentioned pessimistic assumption that every variable is both used and defined within every called procedure is typically used for such portions of the call tree. Thus the portion of the call tree in FIG. 20 which includes PROC_D, PROC_F and PROC_E and their calls to one another are treated in this fashion. The calls from PROC_F to PROC_H and PROC_I, however, can still be processed as described below (i.e., in the same manner as procedures that are not connected to a recursive cycle).

The use of two data flow analysis passes serves the salutary purpose of enabling the definition-use chaining process to take account of both the procedures that call a given procedure and the procedures that it calls without having to either a) perform the definition-use chaining globally—at an unacceptable cost in processing time and space—or b) make worst-case assumptions about these relationships, which assumptions would greatly compromise optimization. Thus, the use of multiple passes over the call tree is important to make the translation process tractable. It also positively affects the memory space required by the program and improves the execution performance.

The first data flow analysis pass is directed to the creation of a list of those variables used in a procedure that a) are at least potentially defined by a procedure called thereby and b) are used, after the call, in the calling procedure. This list is used as a first approximation of a list of variables whose definitions in the called procedure must be preserved for the benefit of the calling procedure which uses them. This approximation will be later refined in the second pass to include only those definitions that actually do occur in the called procedure. (For call tree leaves, this refinement could be done in the first pass but, in this embodiment, is not.)

Figure 21:
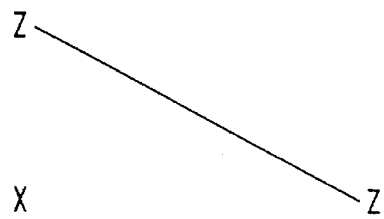
Figure 21:
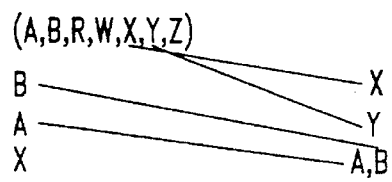
Figure 21:
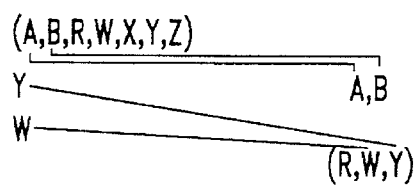

The processing of each procedure during the forward pass is exemplified in FIG. 21 which shows a skeleton of two of the procedures shown in the call tree of FIG. 20—PROC_K and PROC_J, the latter being twice in the course of the former. As will be seen, the net effect of the first-pass data flow analysis of PROC_K vis-a-vis the list for PROC_J will be to find that variables A,B,R,X and Y—whose appearances in the various procedures are described below—all meet the above criteria. That is, they are potentially defined by PROC_J and are used after to a call thereto. The subsequent second-pass data flow analysis of PROC_J will refine this list to the single variable X, which is the only variable on the list actually defined in PROC_J.

Similarly, prior processing of the procedures which call PROC_K has resulted in the creation of a use list for PROC_K comprising the variables W, R and Y. The subsequent second-pass data flow analysis of PROC_K will refine this list to the two variables W and Y, which are the only variables on the PROC_K list actually defined in PROC_K.

As described above, the first step of data flow analysis is to find every explicit mention of a variable and classify each one as being either the location of a definition or the location of a use. This is reflected in FIG. 21 in the two columns which list the definitions and uses present at each program instruction. These definitions and uses are termed "explicit" definitions and uses and, as seen in the FIG., A, B, X, Y and Z are all both defined and used in PROC_K.

Also included in the "uses" column are entries in parentheses of so-called implicit uses. This is a list of variables which, during the first-pass processing of procedures which call PROC_K, were identified—in a manner that will become clear as this description proceeds—as being potentially defined thereby. Thus as shown in FIG. 21, the first-pass processing of the procedure(s) which call PROC_K, such as PROC_D and MAIN (FIG. 20), have identified variables R, W and Y as being potentially defined by PROC_K.

The second step of data flow analysis is to initially classify every call as being the location of a definition of all variables which have uses in the procedure. These are termed implicit definitions and are shown in parentheses in the "definitions" column across from each of the calls to PROC_J. Since A, B, R, W, X, Y, and Z all have uses in PROC_K, each CALL PROC_J instruction is initially regarded as the location of an implicit definition of each of those variables. This initial classification embodies the above-mentioned pessimistic assumption about definitions within calls; at this point it must be assumed that each call defines every variable mentioned in the calling procedure.

The next step is to perform the definition-use chaining in order to associate each use with one or more definitions. (Although not shown in the present example, the existence of multiple definitions for a use comes about as the result of the use being contained in a basic block which is in the chain of succession of several basic blocks, each of which contains a definition of the relevant variable.) The association of particular uses with particular definitions is shown in FIG. 21 by lines which connect each use with its apparent definition. For example, the use of "Z" in the instruction "X=Z" is defined earlier in the instruction "Z=10". In addition, the use of Y in the instruction "A=Y" is (at least at this point assumed to be) defined earlier in the first CALL PROC_J instruction. Moreover, the implicit use of "Y" at the RETURN instruction of PROC_K is defined earlier in the instruction "Y=A+B".

Finally, each call is examined and the definitions ascribed thereto that have associated uses are added to a list of implicit uses associated with the return instruction of the procedure being called. Thus at the end of the first-pass processing of PROC_K, variables A, B, R, X, and Y are recorded at the RETURN instruction of PROC_J. This represents the best guess from the standpoint of PROC_K as to the identity of those variables that may be defined by PROC_J. Note that since W and Z have no explicit uses after any call to PROC_J—at least not without an intervening definition—they are not included in the list of implicit uses associated with the RETURN at the end of PROC_J. Note, moreover, that variable R, which has only implicit definitions and uses in PROC_K, is still included in the list. This is, indeed, appropriate because, as discussed above, variable R is used by some procedure which calls PROC_K and, at this point, it must be assumed that that variable may be defined in PROC_J. (Because PROC_J has not been examined yet, the definitive answer is not yet known.)

At this point, the first-pass processing of PROC_K is complete, that processing having done its job of identifying those variables used in PROC_K that a) at this point must be assumed to be defined by PROC_J, and b) are used after the call to PROC_J. Since PROC_J is a call tree leaf, it contains no calls and since the first pass is, in fact, directed to gathering information about calls, there is no need to process PROC_J or any other of the leaves in the first pass.

The second, reverse pass through the call tree by the data analysis step performs the data flow analysis of each procedure all over again but now makes use of the information gathered in the first pass, as just described. Specifically, the definition-use chaining is again performed—from scratch—but it now incorporates the refined list of implicit definitions and uses developed for each procedure.

Since the pass is in reverse order, PROC_J is processed before PROC_K, and the results of the processing are illustrated in FIG. 22. As shown in that FIG., the first step of the second pass data flow analysis of PROC_J is, again, to find every explicit mention of a variable and classify it as being either the location of a definition or the location of a use. Included in the "uses" column is the list of implicit uses developed during the first pass, that list having variables A, B, R, X and Y. (If there were other procedures which call PROC_J, still other variables could have been added to the list when those procedures were processed during the first pass.) In addition, this pass includes the step of creating a list of implicit definitions associated with the entry point of the the procedure, that list including those variables used in the procedure but not defined therein. In PROC_J, in particular, that list is comprised of the variables Q and S.

As in the first pass, the next data flow analysis step involves associating implicit definitions with all procedures that are called by the procedure being analyzed. However, PROC_J does not call any other procedures and therefore no action is taken at this step.

In the next step, the definition-use chaining is again performed. As shown in FIG. 22, the implicit use of variable X is associated with the definition of that variable in the instruction "X=Q+S", while the explicit uses of variables Q and S are associated with the implicit definitions associated with the entry point of PROC_J. However, variables A, B, R and Y have no definitions in $PROC_{13}j$ despite the fact that they were included in the list of variables that, from the vantage point of PROC_K, were potentially defined in PROC_J. Now the first pass list can be refined by discarding those variables (as shown in FIG. 22 by slashes placed through them), thereby leaving variable X as the only entry. Indeed, variable X is the only variable defined in PROC_J which is used in PROC_K subsequent to a call to PROC_J.

The second pass of data flow analysis through PROC_J is now complete. That is, a final and exact reaching definitions calculation—taking into account the call relationships between PROC_J and other procedures—has been performed. The subsequent transformations of common subexpression elimination, invariant code motion, constant propagation, scalar propagation and dead code elimination are then performed on PROC_J and the optimization of that procedure is complete.

Eventually the second-pass processing will encounter PROC_K and the same steps outlined above relative to the second-pass processing of PROC_J are performed. Of course, PROC_K, unlike. PROC_J, does contain calls. Thus, also unlike PROC_J, definitions need to be associated with these calls. Now, however, it is the refined list of variables developed earlier for PROC_J that is used rather than the list of all variables used in PROC_K, as was the case in that first pass. This list is now "perfect" since it contains only those variables that are, indeed, defined by PROC_J in this case, the single variable X.

In addition, a list of implicit uses is associated with each procedure call, that list being the list of implicit definitions previously developed during the second pass for the called procedure. Thus in PROC_K, the list of variables Q and S developed as implicit definitions at the entry point of PROC_J are used as implicit uses for PROC J calls in PROC_K. This step is necessary because definitions of variables Q and S in PROC_K—or in procedures which call it—are needed by PROC_J. Thus such definitions must be protected from dead code elimination by having a uses associated with them. In this example, variables Q and S are, in fact, not defined in PROC_K and are, therefore, provided in the implicit definitions list associated with the entry point of that procedure in precisely the same way as they were for PROC_J.

The definition-use chaining is now performed, the results of which for PROC_K are, again, shown by connecting lines. Note that the use of the refined information about PROC_J has given rise to a number of significant differences in the reaching definitions calculation relative to the calculation thereof in the first pass.

Figure 16:
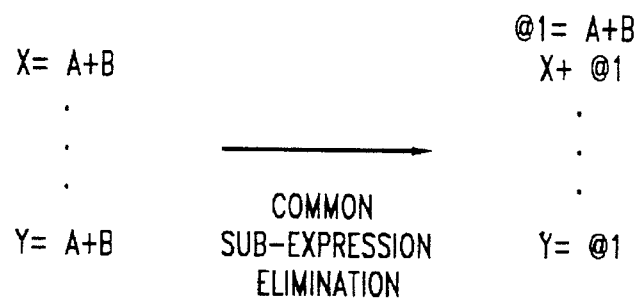
FIGS. 16, 17, 18, and 19 show various fragments of assembly language code which illustrate the different transformations carried out during the optimization component of the translator.

For example, the uses of variables A and B in the instruction "Y=A+B" are now no longer associated with implicit definitions at the second call to PROC_J but, rather, with local definitions of those variables in the instructions "B=X" and "A=Y". The subsequent common sub-expression transformation will thus be able to recognize the instructions "X=A+B" and "Y=A+B" as being common sub-expressions and thus candidates for optimization, exactly as shown in FIG. 16. Furthermore, since variable R is no longer assumed to be defined by the PROC_J calls, the implicit use thereof at the exit of PROC_K now no longer has an associated definition and the list of implicit uses can be refined to exclude that variable (as shown in FIG. 22 by the slash placed through the "R"). In direct analogy to the case of variables A and B just discussed, the elimination of variable R from the implicit use list at the exit of PROC_K will subsequently assist in the optimization of procedures which call PROC_K because variable R will no longer appear on the list of variables that are assumed by those calling procedures to be defined in PROC_K.

Note, too, that there are no uses associated with three of the four definitions of variable X in PROC_K, these being the definitions "X=Z", "X=A+B" and the second CALL PROC__J instruction. All three of these instructions will thus be deleted by dead code elimination. (The instruction "X=A+B" will have been transformed by the common sub-expression elimination step to the form "X=@1" as shown in FIG. 16 but will nonetheless be deleted by dead code elimination for lack of an associated use.

The second pass of data flow analysis through PROC_K is also now complete. The subsequent transformations of common sub-expression elimination, invariant code motion, constant propagation, scalar propagation and dead code elimination are then performed on PROC_K and the optimization of the procedure is complete.

Returning now to FIG. 12, it will be seen that the last phase of the transformation component of the optimization is "synthesis". The overall goal of the synthesis phase of transformation is to produce a representation of the program that is closer to the original compiler source language than is the assembly language representation currently being operated on. Doing this will provide the code generation component (discussed below) with greater opportunity to use the resources and capabilities of the target machine effectively. This improves the translated program both in terms of its size and speed of execution (performance).

To this end, the synthesis phase of transformation looks for sequences of intermediate language instructions that are recognizable as "higher level" functions that can be more efficiently represented than they are in the now-converted-to-intermediate-language source machine object code. Assume, for example, that the source machine processor is not capable of performing a 32-bit multiply operation directly but, rather, requires a series of instructions to carry it out. The target machine may, however, be capable of performing a 32-bit multiply directly. The synthesis phase can be designed to recognize the pattern of instructions as, indeed, constituting a 32-bit multiply and to substitute an appropriate single instruction in the intermediate language version. Other examples are sequences resulting from C language "switch" statements, Pascal "case" statements, looping constructs, etc.

The repertoire of recognizable sequences available to the synthesis phase is developed empirically during the development of the translation software by examining the facilities of the source and target machines and the characteristics of the original object code (which are, of course, dependent on the characteristics of the compiler which generated the source machine application object code in the first place).

In summary, it may be noted that common sub-expression elimination, constant propagation, scalar propagation and synthesis are, in essence, pattern recognition techniques which identify groups of instructions in the expansion which can be replaced by an equivalent smaller group of instructions. Invariant code motion is another type of pattern recognition technique. It does not reduce the number of instructions in the expansion. However, it provides a more efficient re-ordering of the instructions thereof by identifying a sequence of instructions that can be profitably replaced by an equivalent reordered sequence of instructions in said second version.

Code Generation

The code generation phase of the translation process is virtually the same as the code generation phase of a conventional compiler. That is, the intermediate language version of the application, optimized as described above, is converted to the assembly language of the target machine by substituting one or more appropriate target machine assembly language instructions for each intermediate language instruction. The resulting code is thereupon assembled into target machine object code and bound with the translated system software.

FIG. 23 shows an illustrative way in which a translated application is bound to the translated system software and target machine system software. In this context, the term "binding" refers to the process by which symbolic addresses in software are converted, ultimately, to actual addresses that the processor can operate on.

More specifically, as is very conventional in the art, the binding is illustratively in two stages. In the first stage, known as "linking", symbolic references within a first object code module (such as a translated application) to an entry point of a second object code module (such as the translated system software) are converted into numerical offsets which label all such entry points relative to the first address of the combined object programs. In the second stage, which is encompassed within the so-called "loading"process, those offsets are thereafter converted into addresses that the processor can operate on.

In FIG. 23, then, the first column shows three object modules—a translated application, translated system software and target machine system software—in their as-compiled form. At this point, each of the modules may be thought of as having its own set of address locations beginning at 0x0 and ending at 0x1000, 0x200 and 0x600, respectively.

The translated application illustratively includes a call to a procedure PROC_J which is internal to the application. Thus the code generation component of the translator—which provides a compiler function in this regard—has been able to recognize the reference to PROC_J at 0x200 and has replaced what had been a mention of "PROC_J" in the intermediate language code with an offset indicative of the location of the entry point of PROC_J relative to the starting point of the module—that entry point illustratively being 0x800.

The translated application further includes two calls to system services—SERVICE1 and SERVICE2—which are programs within the translated system software and target machine system software, respectively. Since these calls reference programs that are outside of the translated application, the mentions of SERVICE1 and SERVICE2 cannot be "resolved", i.e., replaced with offsets, by the code generator. Similarly, a reference within the translated system software to a system service SERVICE3 within the target machine system software remains unresolved at this point.

The second column of FIG. 23 shows the three modules after inking. Specifically, the linker has combined the three modules into a single address spectrum from 0x0 to 0x1800 and each instruction has an address within that spectrum. Thus, the first address of the translated system software is now 0x1000 while the first address of the target machine system software is 0x1200. The various symbolic references to SERVICE1, SERVICE2 and SERVICE3 can now been replaced with offsets—0x1000; 0x1300 and 0x1600, respectively, reckoned relative to the starting point of the linked modules.

In some computer systems, the offsets provided by the linker provide an adequate basis for program execution; the actual address in memory of program code identified by an offset in, say, a call instruction is determined during actual program execution by adding the offset to the address of the call instruction itself. Thus, for example, offset 0x800 in the second translated application call can be added to the location, 0x200, of the call itself in order to determine that flow of control should pass to location 0x1000. In the present illustrative embodiment, however, the processor requires the executable code to contain the addresses rather than offsets. This is accommodated when the code is loaded into RAM for execution by simply adding to each offset the actual starting RAM address at which the code is loaded. Thus as seen in the third column of FIG. 23, the linked modules have been loaded into RAM beginning at location 0x5000, and all calls now identify as the target of the call the pre-computed address given by the sum of 0x5000 with the relevant offset.

OTHER EMBODIMENTS

The foregoing merely illustrates the principles of the invention.

For example, in the illustrative embodiment shown and described hereinabove, the source machine and the target machine have disparate processors having disparate instruction sets. However, it may be the case that the two processors belong to a common processor family—and thus may have the same instruction sets—but one of the processors has, for example, a 24-bit address space and the other has a 32-bit address space. Thus, the translation may involve only minor conversions of the instructions.

As another example, in the illustrative embodiment shown and described hereinabove, the application executing on the target machine and invoking translated system software in accordance with the invention need not itself be a program that was translated. For example, the source and target machines may use the identical processor type and thus an application compiled for the source machine will be executable on the target machine without having to be translated. However, the system software and/or the address spaces of the two machines may be different. It may thus be advantageous to link the not-needed-to-be-translated application with the translated system software for execution in the target machine.

Moreover, although the invention as illustrated herein operates on an object code version of the program being translated, it will be appreciated that the input program could be, alternatively, for example, a) an assembly language version thereof or b) embodied in so-called interpretive code which is in a form intended to be interpreted on the source machine. An example of the latter are programs output by the UCSD Pascal P-code compilers. In some cases, the use of a different, intermediate assembly language may not be necessary. Rather, then expansion can be carried out in terms of the original assembly language or other instruction set. Moreover, it may be desired to execute the translated program in assembly form (using an interpreter) rather than compiling it into target machine object form.

It will thus be appreciated that those skilled in the art will be able to devise numerous arrangements which, although not explicitly shown or described herein, embody the principles of the invention and are thus within its spirit and scope.

We claim:

1. A method of translating a first non-source code computer program having a predetermined functionality into a second non-source code computer program having a functionality substantially the same as the first non-source code computer program, the first non-source code computer program being executable by a source computer, but not a target computer, the second non-source code computer program being executable by the target computer without translation, simulation, or emulation during execution, comprising the steps of:

expanding each instruction in the first non-source code computer program into one or more intermediate language instructions which explicitly replicate primary and secondary effects of each instruction in the first non-source code computer program so that an intermediate language representation of the entire first non-source code computer program is created which has substantially the entire functionality of the first non-source code computer program; and processing the intermediate language representation of the first non-source code computer program to eliminate intermediate language instructions whose elimination does not substantially affect the functionality of the intermediate language representation, the processing step comprising the steps of:

identifying one or more procedures in the intermediate language representation, at least one of the procedures comprising:

a procedure head block and one or more basic blocks, a basic block being a sequence of instructions that has exactly one instruction at which control can enter the sequence during execution and exactly one instruction at which control leaves the sequence during execution and a procedure head block being a basic block whose first instruction is either an entry point of the computer program or a target of a call, each procedure being composed of a procedure head block and all basic blocks reachable from the procedure head block through a sequence of successors from the procedure head block, the basic blocks being those which are not procedure head blocks and those to which flow of control from the procedure head block does not pass through any other intermediate procedure head block; and performing procedure by procedure data flow analysis of the intermediate language representation in response to the identifying step to eliminate instructions whose elimination does not substantially change the functionality of the intermediate language representation.

2. The method of claim 1 wherein said secondary effects include the calculation of secondary information and wherein said eliminated instructions include instructions which calculate secondary information which is unused by said program.

3. The method of claim 1 wherein said data flow analysis step includes a step of performing definition-use chaining over said expanded version.

4. The method of claim 1 wherein said data flow analysis step is performed over said expanded version globally.

5. The method of claim 1 wherein the data flow analysis includes a step of finding among definitions of variables which occur in a procedure those definitions which are used in at least one other procedure.

6. The method of claim 1 wherein at least ones of said procedures include definitions of values of variables, which values have uses in at least one other procedure, and wherein said data flow analysis step includes a step of associating such definitions with such uses.

7. The method of claim 6 wherein said associating step is carried out by using at least first and second data flow analysis steps.

8. The method of claim 1 wherein said processing step includes the use of at least a first pattern recognition technique to identify groups of instructions in said expanded version which can be replaced by an equivalent smaller group of instructions in said second version.

9. The method of claim 1 wherein said processing step includes the use of at least a first pattern recognition technique to identify a sequence of instructions that can be replaced by an equivalent reordered sequence of instructions in said second version.

10. The method of claim 1 wherein said expanded version is expressed in terms of an intermediate computer language which is different from the language in which said first version is expressed.

11. A method of translating a first non-source code computer program having a first functionality into a second non-source code computer program having a second functionality substantially the same as the first non-source code computer program, the first non-source code computer program being executable by a source computer, but not a target computer, the second non-source code computer program being executable by the target computer without translation, simulation, or emulation during execution on the target computer, comprising the steps of:

expanding each instruction in a first non-source code computer program having a first functionality, executable on a source computer, but not on a target computer, into one or more intermediate language instructions which explicitly replicate primary and secondary effects of each instruction in the first non-source code computer program so that an intermediate language representation of the entire first non-source code computer program is created which has substantially the entire first functionality of the first non-source code computer program;

processing the intermediate language representation of the first non-source code computer program to eliminate intermediate language instructions whose elimination does not substantially affect the functionality of the intermediate language representation, the processing step comprising the steps of:

identifying one or more procedures in the intermediate language representation, at least one of the procedures comprising:

a procedure head block and one or more basic blocks, a basic block being a sequence of instructions that has exactly one instruction at which control can enter the sequence during execution and exactly one instruction at which control leaves the sequence during execution and a procedure head block being a basic block whose first instruction is either an entry point of the computer program or a target of a call, each procedure being composed of a procedure head block and all basic blocks reachable from the procedure head block through a sequence of successors from the procedure head block, the basic blocks being those which are not procedure head blocks and those to which flow of control from the procedure head block does not pass through any other intermediate procedure head block; and performing procedure by procedure data flow analysis globally over the intermediate language representation in response to the identifying step to eliminate instructions whose elimination does not substantially change the functionality of the intermediate language representation; and converting the intermediate language representation into a second non-source code computer program having a second functionality substantially the same as the first functionality, the second non-source code computer program being executable by the target computer without translation, simulation, or emulation during execution on the target computer.

* * * * *